(12) United States Patent
Shimomura et al.

(10) Patent No.: US 11,038,665 B2
(45) Date of Patent: Jun. 15, 2021

(54) TRANSMISSION APPARATUS AND COMMUNICATION SYSTEM

(71) Applicant: SONY SEMICONDUCTOR SOLUTIONS CORPORATION, Kanagawa (JP)

(72) Inventors: Yukio Shimomura, Kanagawa (JP); Tatsuya Sugioka, Tokyo (JP); Katsushi Hanaoka, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/633,655

(22) PCT Filed: Apr. 27, 2018

(86) PCT No.: PCT/JP2018/017113
§ 371 (c)(1),
(2) Date: Jan. 24, 2020

(87) PCT Pub. No.: WO2019/026362
PCT Pub. Date: Feb. 7, 2019

(65) Prior Publication Data
US 2020/0213074 A1 Jul. 2, 2020

(30) Foreign Application Priority Data

Aug. 2, 2017 (JP) .............................. JP2017-149654

(51) Int. Cl.
*H04L 7/033* (2006.01)
*G06F 1/08* (2006.01)

(52) U.S. Cl.
CPC ................ *H04L 7/033* (2013.01); *G06F 1/08* (2013.01)

(58) Field of Classification Search
CPC ......... H04L 7/0008; H04L 7/033; G06F 1/08; G06F 1/12; H03L 7/0807; H04B 1/0475
See application file for complete search history.

(56) References Cited

U.S. PATENT DOCUMENTS 8,250,399 B1 * 8/2012 Mizrahi ............ H04L 12/40032
713/502
9,632,568 B2 * 4/2017 Nishikawa ............ G06F 1/3296
(Continued)

FOREIGN PATENT DOCUMENTS

| JP | 2011-097354 A | 5/2011 |
| JP | 2012-120159 A | 6/2012 |

(Continued)

OTHER PUBLICATIONS

International Search Report and Written Opinion of PCT Application No. PCT/JP2018/017113, dated Jul. 17, 2018, 06 pages of ISRWO.

*Primary Examiner* — Khanh C Tran
(74) *Attorney, Agent, or Firm* — Chip Law Group

(57) ABSTRACT

There is provided a transmission apparatus including a clock signal generator that generates a clock signal and a transmitter that operates on the basis of the clock signal and transmits data in which the clock signal is embedded or a synchronization signal for maintaining CDR synchronization, in which during a period of data transmission, the clock signal generator generates a first clock signal for data transmission and the transmitter transmits data in which the first clock signal is embedded on the basis of the first clock signal, and during a pause period of data transmission, the clock signal generator generates a second clock signal having a frequency lower than that of the first clock signal and the transmitter transmits the synchronization signal on the basis of the second clock signal.

7 Claims, 22 Drawing Sheets

(56) References Cited

U.S. PATENT DOCUMENTS

| | | | |
|---|---|---|---|
| 2011/0007066 A1* | 1/2011 | Chang | G09G 3/3611 |
| | | | 345/214 |
| 2011/0103511 A1 | 5/2011 | Uehara | |
| 2014/0118035 A1* | 5/2014 | Yamashida | G11C 7/20 |
| | | | 327/143 |
| 2016/0359612 A1* | 12/2016 | Shi | H03L 7/0807 |
| 2017/0017587 A1* | 1/2017 | West | G11C 7/222 |
| 2017/0315652 A1* | 11/2017 | Pourbigharaz | G06F 1/08 |
| 2018/0321705 A1* | 11/2018 | Koshisaka | H04L 25/00 |

FOREIGN PATENT DOCUMENTS

| | | |
|---|---|---|
| JP | 2012-182716 A | 9/2012 |
| JP | 2012-199797 A | 10/2012 |

\* cited by examiner

FIG. 21

| CATEGORY | SUBCATEGORY | DATA VOLUME | CONTENT |
|---|---|---|---|
| FRAME INFORMATION | Frame Start | 1bit | INDICATING START OF FRAME (E.G., FIRST LINE) |
| | Frame End | 1bit | INDICATING END OF FRAME (E.G., REAR DUMMY FRONT LINE) |
| LINE INFORMATION | Line Valid | 1bit | INDICATING VALIDITY/INVALIDITY OF LINE |
| | Line Number | 13bit | INDICATING LINE NUMBER |
| OTHERS | Reserved | 32bit | SECURED FOR FUTURE SCALABILITY |
| | Header ECC | 18byte | ECC OF HEADER INFORMATION |

FIG. 22

| Byte | Bit | Contents | | Byte | Bit | Contents | |
|---|---|---|---|---|---|---|---|
| H1 | 15 | CRC [15] | X^15 | H3 | 31 | Reserved [15] | |
| | 14 | CRC [14] | X^14 | | 30 | Reserved [14] | |
| | 13 | CRC [13] | X^13 | | 29 | Reserved [13] | |
| | 12 | CRC [12] | X^12 | | 28 | Reserved [12] | |
| | 11 | CRC [11] | X^11 | | 27 | Reserved [11] | |
| | 10 | CRC [10] | X^10 | | 26 | Reserved [10] | |
| | 9 | CRC [9] | X^9 | | 25 | Reserved [9] | |
| | 8 | CRC [8] | X^8 | | 24 | Reserved [8] | |
| H0 | 7 | CRC [7] | X^7 | H2 | 23 | Reserved [7] | |
| | 6 | CRC [6] | X^6 | | 22 | Reserved [6] | |
| | 5 | CRC [5] | X^5 | | 21 | Reserved [5] | |
| | 4 | CRC [4] | X^4 | | 20 | Reserved [4] | |
| | 3 | CRC [3] | X^3 | | 19 | Reserved [3] | |
| | 2 | CRC [2] | X^2 | | 18 | Reserved [2] | |
| | 1 | CRC [1] | X^1 | | 17 | Reserved [1] | |
| | 0 | CRC [0] | X^0 | | 16 | Reserved [0] | |

| Byte | Bit | Contents | Byte | Bit | Contents |
|---|---|---|---|---|---|
| H5 | 47 | Reserved [31] | H7 | 63 | Frame Start |
| | 46 | Reserved [30] | | 62 | Frame End |
| | 45 | Reserved [29] | | 61 | Line Valid |
| | 44 | Reserved [28] | | 60 | Line Number [12] |
| | 43 | Reserved [27] | | 59 | Line Number [11] |
| | 42 | Reserved [26] | | 58 | Line Number [10] |
| | 41 | Reserved [25] | | 57 | Line Number [9] |
| | 40 | Reserved [24] | | 56 | Line Number [8] |
| H4 | 39 | Reserved [23] | H6 | 55 | Line Number [7] |
| | 38 | Reserved [22] | | 54 | Line Number [6] |
| | 37 | Reserved [21] | | 53 | Line Number [5] |
| | 36 | Reserved [20] | | 52 | Line Number [4] |
| | 35 | Reserved [19] | | 51 | Line Number [3] |
| | 34 | Reserved [18] | | 50 | Line Number [2] |
| | 33 | Reserved [17] | | 49 | Line Number [1] |
| | 32 | Reserved [16] | | 48 | Line Number [0] |

TRANSMISSION APPARATUS AND COMMUNICATION SYSTEM

CROSS REFERENCE TO RELATED APPLICATIONS

This application is a U.S. National Phase of International Patent Application No. PCT/JP2018/017113 filed on Apr. 27, 2018, which claims priority benefit of Japanese Patent Application No. JP 2017-149654 filed in the Japan Patent Office on Aug. 2, 2017. Each of the above-referenced applications is hereby incorporated herein by reference in its entirety.

TECHNICAL FIELD

The present disclosure relates to a transmission apparatus and a communication system.

BACKGROUND ART

Techniques for efficiently transmitting data have been developed. Examples of the technique for distributing packets storing data to a plurality of lanes and transmitting data through the plurality of lanes include a technique disclosed in Patent Document 1 set out below.

CITATION LIST

Patent Document

Patent Document 1: Japanese Patent Application Laid-Open No. 2012-120159

SUMMARY OF THE INVENTION

Problems to be Solved by the Invention

In a communication system including a transmission apparatus and a receiving apparatus, one of the methods for reducing power consumption in the transmission apparatus during a pause period of data transmission such as packet transmission is a "method in which the transmission apparatus stops signal transmission during a pause period and starts signal transmission after the pause period has elapsed". However, in the case of using one method described above, data cannot be efficiently transmitted due to the following reasons.
- It takes time for direct current (DC) potential to return to the level before the pause when the signal transmission resumes after the pause period has elapsed
- It takes time for synchronization in a clock data recovery (CDR) circuit (hereinafter may be referred to as "CDR Lock") in the receiving apparatus after the signal transmission resumes in the transmission apparatus Examples of a method of suppressing the situation that occurs in one method described above include a method of transmitting invalid data during the data transmission pause period. However, in the case of transmitting invalid data during the data transmission pause period, the transmission apparatus consumes power also during the data transmission pause period in a similar manner to the data transmission period. Therefore, in the case of transmitting invalid data during the data transmission pause period, data transmission with low power consumption cannot be expected.

The present disclosure proposes a novel and improved transmission apparatus and a communication system capable of reducing power consumption while maintaining CDR synchronization in a receiving apparatus.

Solutions to Problems

According to the present disclosure, there is provided a transmission apparatus including a clock signal generator that generates a clock signal and a transmitter that operates on the basis of the clock signal and transmits data in which the clock signal is embedded or a synchronization signal for maintaining CDR synchronization, in which during a period of data transmission, the clock signal generator generates a first clock signal for data transmission and the transmitter transmits data in which the first clock signal is embedded on the basis of the first clock signal, and during a pause period of data transmission, the clock signal generator generates a second clock signal having a frequency lower than that of the first clock signal and the transmitter transmits the synchronization signal on the basis of the second clock signal.

Furthermore, according to the present disclosure, there is provided a communication system including a transmission apparatus that transmits data in which a clock signal is embedded or a synchronization signal for maintaining CDR synchronization, and a receiving apparatus including a CDR circuit that extracts the clock signal from received data or the synchronization signal and generates a synchronized clock signal synchronized with the extracted clock signal, in which the transmission apparatus includes a clock signal generator that generates the clock signal, and a transmitter that operates on the basis of the clock signal and transmits the data in which the clock signal is embedded or the synchronization signal, and during a period of data transmission, the clock signal generator generates a first clock signal for data transmission and the transmitter transmits data in which the first clock signal is embedded on the basis of the first clock signal whereas during a pause period of data transmission, the clock signal generator generates a second clock signal having a frequency lower than that of the first clock signal and the transmitter transmits the synchronization signal on the basis of the second clock signal.

Effects of the Invention

According to the present disclosure, it becomes possible to achieve low power consumption while maintaining CDR synchronization in the receiving apparatus.

Note that the effects described above are not necessarily limited, and any of the effects described in the present specification or another effect that can be understood from the present specification may be exerted in addition to the effects described above or instead of the effects described above.

BRIEF DESCRIPTION OF DRAWINGS

FIG. 21 is an explanatory diagram for illustrating various kinds of data included in the header illustrated in FIG. 20.

FIG. 22 is an explanatory diagram illustrating an exemplary bit sequence included in one set of header information and a CRC code.

MODE FOR CARRYING OUT THE INVENTION

Hereinafter, a preferred embodiment of the present disclosure will be described in detail with reference to the accompanying drawings. Note that, in the present specification and the drawings, constituent elements having substantially the same functional configuration will be denoted by the same reference signs, and duplicate descriptions thereof will be omitted.

Furthermore, descriptions will be given in the following order.

1. Communication system according to the present embodiment

[1] Communication system according to the present embodiment

[2] Effects exerted in the communication system according to the present embodiment

[3] Exemplary application of the communication system according to the present embodiment (Communication System According to the Present Embodiment)

[1] Communication System According to the Present Embodiment

Figure 1:
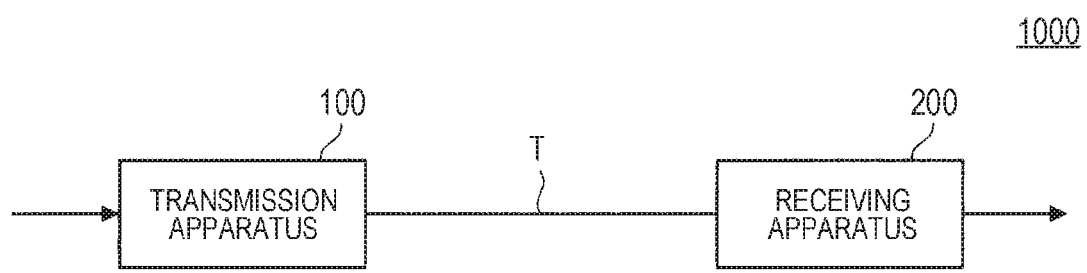
FIG. 1 is an explanatory diagram illustrating an exemplary configuration of a communication system according to the present embodiment.

FIG. 1 is an explanatory diagram illustrating an exemplary configuration of a communication system 1000 according to the present embodiment. The communication system 1000 includes, for example, a transmission apparatus 100 and a receiving apparatus 200.

The transmission apparatus 100 and the receiving apparatus 200 exchange data with each other via a transmission path T, for example.

Examples of the transmission path T include a serial communication transmission path of an embedded clock type using CDR for reception synchronization. That is, the communication system 1000 is applied to, for example, any serial communication of an embedded clock type using CDR for reception synchronization, the serial communication being capable of performing wired or wireless communication, such as peripheral component interconnect (PCI) express, universal serial bus (USB) 3.x, display port, mobile industry processor interface (MIPI) M-PHY, VbyOne, and scalable low voltage signaling with embedded clock (SLVS-EC). Exemplary application of the communication system according to the present embodiment will be described later.

Hereinafter, an exemplary configuration of each of the transmission apparatus 100 and the receiving apparatus 200 will be described using an exemplary case where the transmission path T is a differential signal line and the transmission apparatus 100 and the receiving apparatus 200 exchange data with each other using differential signals.

[1-1] Receiving Apparatus 200

The receiving apparatus 200 is a device having a function of receiving data transmitted from the transmission apparatus 100. The receiving apparatus 200 includes at least a CDR circuit that extracts clock signals from received data or synchronization signals (to be described later) and generates synchronized clock signals synchronized with the extracted clock signals.

Furthermore, the receiving apparatus 200 may decode the data transmitted from the transmission apparatus 100 on the basis of the synchronized clock signals, for example. The decoded data is processed by, for example, an external device of the receiving apparatus 200 or a processor included in the receiving apparatus 200.

Figure 2:
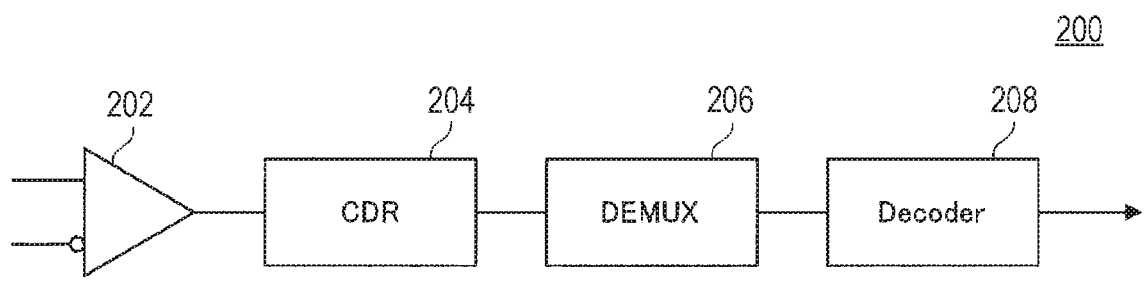
FIG. 2 is a block diagram illustrating an exemplary configuration of a receiving apparatus according to the present embodiment.

FIG. 2 is a block diagram illustrating an exemplary configuration of the receiving apparatus 200 according to the present embodiment. The receiving apparatus 200 includes, for example, a receiver circuit 202, a CDR circuit 204, a demultiplexer 206, and a decoder 208. In FIG. 2, the CDR circuit 204 is indicated as "CDR", the demultiplexer 206 is indicated as "DEMUX", and the decoder 208 is indicated as "Decoder" (the same applies to other drawings hereinafter).

The receiving apparatus 200 is driven by, for example, power supplied from an internal power supply (not illustrated) included in the receiving apparatus 200, such as a battery, power supplied from an external power supply connected to the receiving apparatus 200, or the like.

The receiver circuit 202 converts current flowing through the differential signal line into voltage signals. As will be described later, the voltage signals converted in the data transmission period are signals corresponding to data in which clock signals are embedded, and the voltage signals converted in the data transmission pause period are signals indicating synchronization signals. Examples of the data transmission pause period according to the present embodiment include any period during which data to be transmitted in the data transmission period is not transmitted, such as a blanking period of image data.

Examples of the receiver circuit 202 include a current-voltage conversion circuit using an operational amplifier.

The CDR circuit 204 generates clock signals synchronized with data (hereinafter referred to as "synchronized clock signals") from the voltage signals. The CDR circuit 204 extracts the clock signals from the voltage signals, and generates synchronized clock signals synchronized with the extracted clock signals. As described above, the voltage signals converted in the data transmission period are signals corresponding to the data in which the clock signals are embedded, and the voltage signals converted in the data transmission pause period are signals indicating the synchronization signals. That is, the CDR circuit 204 extracts the clock signals from the received data or the synchronization signals. Examples of the CDR circuit 204 include a phase locked loop (PLL) circuit.

The demultiplexer 206 converts received serial data into parallel data, and performs demultiplexing.

The decoder 208 decodes the signals demultiplexed by the demultiplexer 206.

The receiving apparatus 200 has the configuration illustrated in FIG. 2, for example, thereby receiving data transmitted from the transmission apparatus 100.

Note that the configuration of the receiving apparatus 200 according to the present embodiment is not limited to the example illustrated in FIG. 2.

For example, "the demultiplexer 206 and the decoder 208 illustrated in FIG. 2" or "the decoder 208 illustrated in FIG. 2" may be a circuit external to the receiving apparatus 200.

Furthermore, although an exemplary configuration of the receiving apparatus 200 corresponding to the case where the transmission path T is a differential signal line is illustrated in FIG. 2, the receiving apparatus 200 can have a configuration corresponding to the transmission path T.

[1-2] Transmission Apparatus 100

[1-2-1] "Method in which a Transmission Apparatus Stops Signal Transmission During a Pause Period and Starts Signal Transmission after the Pause Period has Elapsed" and "Method for Transmitting Invalid Data During a Data Transmission Pause Period"

Before describing an exemplary configuration of the transmission apparatus 100 according to the present embodiment, the "method in which the transmission apparatus stops signal transmission during the pause period and starts signal transmission after the pause period has elapsed" described above and the "method for transmitting invalid data during the data transmission pause period" described above will be described again.

Figure 3:
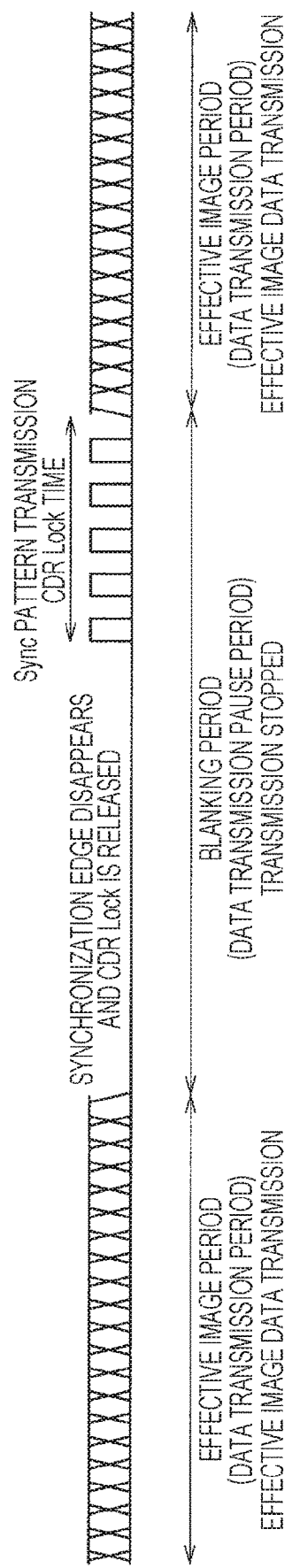
FIG. 3 is an explanatory diagram for illustrating a "method in which a transmission apparatus stops signal transmission during a pause period and starts signal transmission after the pause period has elapsed".

FIG. 3 is an explanatory diagram for illustrating the "method in which the transmission apparatus stops signal transmission during the pause period and starts signal transmission after the pause period has elapsed". FIG. 3 illustrates operation in the case where the transmission apparatus stops signal transmission during a blanking period (exemplary data transmission pause period; the same applies hereinafter) of image data and starts signal transmission during an effective image period (exemplary data transmission period; the same applies hereinafter) after the blanking period has elapsed.

As illustrated in FIG. 3, in a case where signal transmission is stopped during the blanking period of the image data, there is no synchronization edge, whereby the CDR circuit is out of synchronization in the receiving apparatus. Therefore, as illustrated in FIG. 3, the transmission apparatus needs to transmit signals for the synchronization in the CDR circuit before the effective image period after the blanking period has elapsed, and the synchronization in the CDR circuit requires time. Furthermore, as described above, when the signal transmission resumes after the blanking period of the image data has elapsed, it takes time for DC potential to return to the level before the pause.

Therefore, in a case where the "method in which the transmission apparatus stops signal transmission during the pause period and starts signal transmission after the pause period has elapsed" as illustrated in FIG. 3 is used, data cannot be transmitted efficiently.

Meanwhile, examples of a method for suppressing the situation that occurs in the "method in which the transmission apparatus stops signal transmission during the pause period and starts signal transmission after the pause period has elapsed" as illustrated in FIG. 3 include the "method for transmitting invalid data during the data transmission pause period" as described above.

Figure 4:
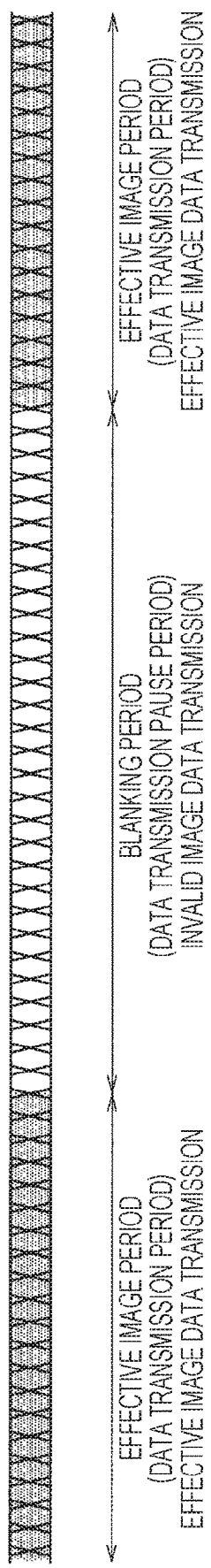
FIG. 4 is an explanatory diagram for illustrating a "method for transmitting invalid data during a data transmission pause period".

FIG. 4 is an explanatory diagram for illustrating the "method for transmitting invalid data during the data transmission pause period". In a similar manner to FIG. 3, FIG. 4 illustrates operation in the case where the transmission apparatus transmits image data.

As illustrated in FIG. 4, in a case where the "method for transmitting invalid data during the data transmission pause period" is used, invalid image data is transmitted during the blanking period of image data. Therefore, the synchronization in the CDR circuit is maintained in the receiving apparatus even during the blanking period of the image data.

However, in a case where the "method for transmitting invalid data during the data transmission pause period" is used, the transmission apparatus consumes poser even during the blanking period of the image data in a similar manner to the effective image period of the image data. Therefore, in a case where the "method for transmitting invalid data during the data transmission pause period" as illustrated in FIG. 4 is used, power consumption cannot be reduced.

Figure 5:
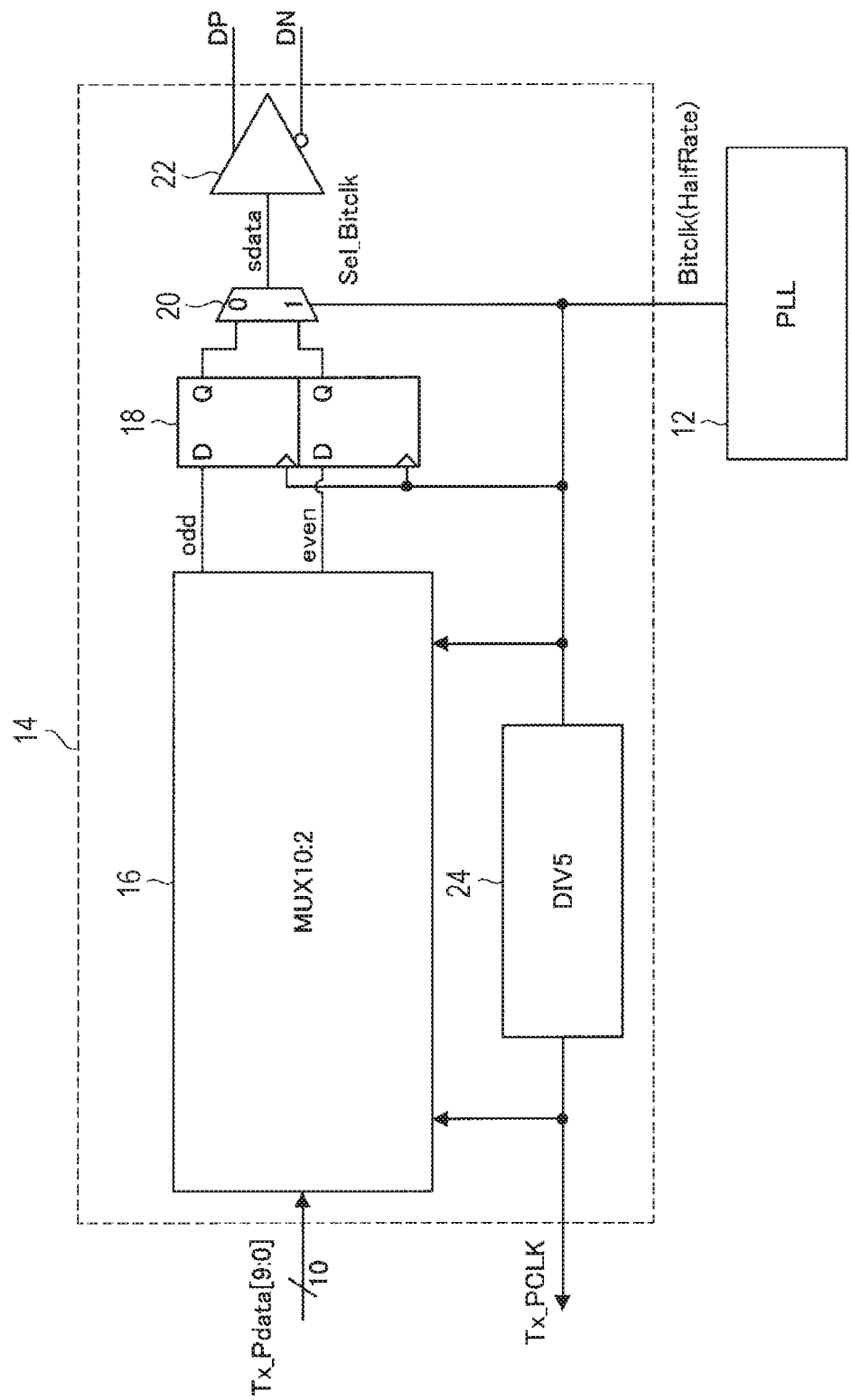
FIG. 5 is an explanatory diagram illustrating an exemplary configuration of the transmission apparatus to which the "method for transmitting invalid data during a data transmission pause period" is applied.

FIG. 5 is an explanatory diagram illustrating an exemplary configuration of a transmission apparatus 10 to which the "method for transmitting invalid data during the data transmission pause period" is applied. FIG. 5 illustrates an exemplary case where the transmission apparatus 10 transmits 10 [bit] parallel data as serial data.

The transmission apparatus 10 includes, for example, a PLL circuit 12, and a transmitter 14. The transmission apparatus 10 is driven by, for example, power supplied from an internal power supply (not illustrated) included in the transmission apparatus 10, such as a battery, power supplied from an external power supply connected to the transmission apparatus 10, or the like.

The PLL circuit 12 functions as a clock signal generator in the transmission apparatus 10, and generates clock signals. For example, in a case where the data transmission speed in the transmission apparatus 10 is 5 [Gbps], examples of the clock signals generated by the PLL circuit 12 include clock signals having a frequency of 2.5 [GHz].

The transmitter 14 operates on the basis of the clock signals generated by the PLL circuit 12, and transmits data in which the clock signals are embedded.

The transmitter 14 includes, for example, a multiplexer 16, a D-type flip-flop 18, a selector 20, a driver 22, and a frequency divider circuit 24. FIG. 5 illustrates an exemplary case where the multiplexer 16 is a 10-input 2-output multiplexer, and the multiplexer 16 is indicated as "MUX10:2". Furthermore, FIG. 5 illustrates an exemplary case where the frequency divider circuit 24 is a ⅕ frequency divider circuit that divides the frequency by five.

The multiplexer 16, the D-type flip-flop 18, and the selector 20 function as a parallel-serial conversion circuit that converts parallel data into serial data. The multiplexer 16 operates on the basis of the clock signals transmitted from the PLL circuit 12 and the signals obtained by dividing the clock signals in the frequency divider circuit 24. Furthermore, the D-type flip-flop 18 and the selector 20 operates on the basis of the clock signals transmitted from the PLL circuit 12.

Figure 6:
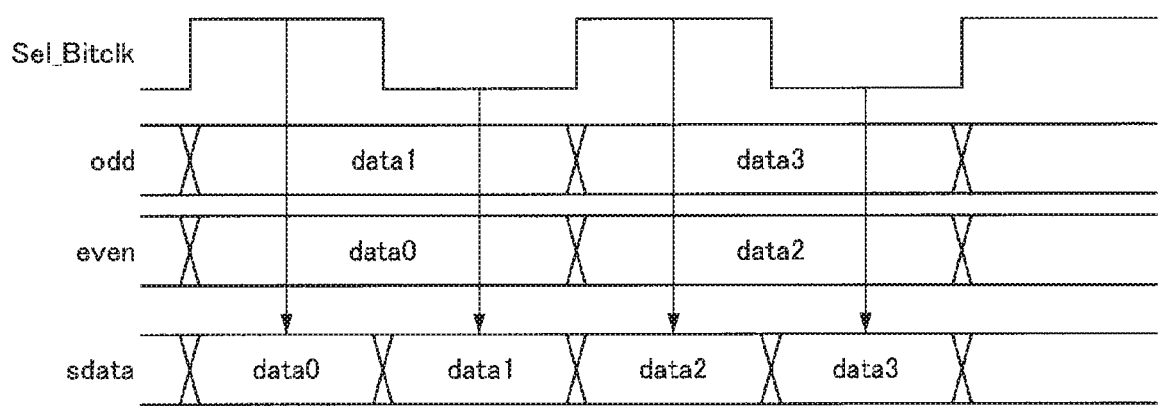
FIG. 6 is an explanatory diagram illustrating exemplary operation in the transmission apparatus illustrated in FIG. 5.

FIG. 6 is an explanatory diagram illustrating exemplary operation in the transmission apparatus 10 illustrated in FIG. 5, which illustrates exemplary operation of generating serial data in which the clock signals are embedded based on the clock signals generated by the PLL circuit 12.

The driver 22 drives the differential signal line with current to transmit the serial data in which the clock signals are embedded.

The transmission apparatus 10 has a configuration illustrated in FIG. 5, for example.

Here, in the transmission apparatus 10, the selector 20 corresponding to the exit portion of the data to be transmitted constantly operates at a clock equal to the data transmission speed. Therefore, the transmission apparatus 10 consumes a large amount of power, and a reduction in power consumption cannot be expected.

[1-2-2] Outline of the Transmission Apparatus 100

An outline of the transmission apparatus 100 will be described.

The transmission apparatus 100 is a device having a function of transmitting data in which clock signals are embedded during a data transmission period. Any data, such as image data generated by imaging with an imaging device and data read from a recording medium, is input to the transmission apparatus 100, and data in which clock signals are embedded in the input data are transmitted, for example.

Furthermore, the transmission apparatus 100 has a function of transmitting synchronization signals for maintaining CDR synchronization during a data transmission pause period.

The transmission apparatus 100 generates first clock signals for data transmission during a data transmission period, and transmits data in which clock signals are embedded on the basis of the first clock signals.

Furthermore, during the data transmission pause period, the transmission apparatus 100 generates second clock signals having a frequency lower than that of the first clock signals, and transmits synchronization signals on the basis of the second clock signals. That is, the transmission apparatus 100 operates with the second clock signals (low-speed clock) having a frequency lower than that of the first clock signals (high-speed clock) for data transmission during the data transmission pause period.

Therefore, the transmission apparatus 100 can reduce power consumption during the data transmission pause period. Furthermore, during the data transmission pause period, the transmission apparatus 100 transmits synchronization signals, thereby maintaining CDR synchronization in the receiving apparatus 200.

Therefore, the transmission apparatus 100 has "a function of transmitting data in which clock signals are embedded during the data transmission period" and "a function of transmitting synchronization signals during the data transmission pause period", whereby power consumption can be reduced while maintaining the CDR synchronization in the receiving apparatus 200.

Figure 7:
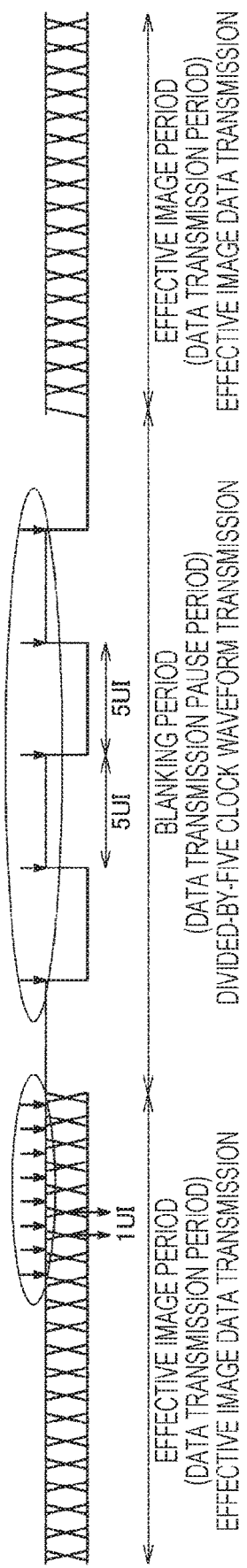
FIG. 7 is an explanatory diagram for illustrating exemplary operation of the transmission apparatus according to the present embodiment.

FIG. 7 is an explanatory diagram for illustrating exemplary operation of the transmission apparatus 100 according to the present embodiment. In a similar manner to FIG. 3, FIG. 7 illustrates exemplary operation in the case where the transmission apparatus 100 transmits image data.

As illustrated in FIG. 7, the transmission apparatus 100 transmits a clock waveform (exemplary synchronization signal) obtained by dividing the clock waveform in the effective image period by five during the blanking period of the image data, for example. By a synchronization edge being transmitted periodically, the CDR synchronization in the CDR circuit 204 is maintained in the receiving apparatus 200 even during the blanking period of the image data (that is, "lock keep standby" is implemented).

Furthermore, the transmission apparatus 100 operates with the second clock signals having a frequency lower than that of the first clock signals for data transmission during the blanking period of image data. Therefore, in the transmission apparatus 100, power consumption can be reduced compared with the "case where the transmission apparatus 10 illustrated in FIG. 5 transmits a clock waveform obtained by dividing the clock waveform in the effective image period by five during the blanking period of the image data", for example.

Note that the exemplary operation in the case where the transmission apparatus 100 transmits image data is not limited to the example illustrated in FIG. 7.

For example, although the pulse width of the synchronization signal is set to the maximum run length 5UI in the 8b10b encoding scheme in FIG. 7, the maximum run length differs depending on the encoding scheme such as 64b/66b and 128b/132b. Therefore, the transmission apparatus 100 can transmit synchronization signals with a pulse width optimized in accordance with the encoding scheme.

[1-2-3] Configuration of the Transmission Apparatus 100

Next, an exemplary configuration of the transmission apparatus 100 will be described.

Figure 8:
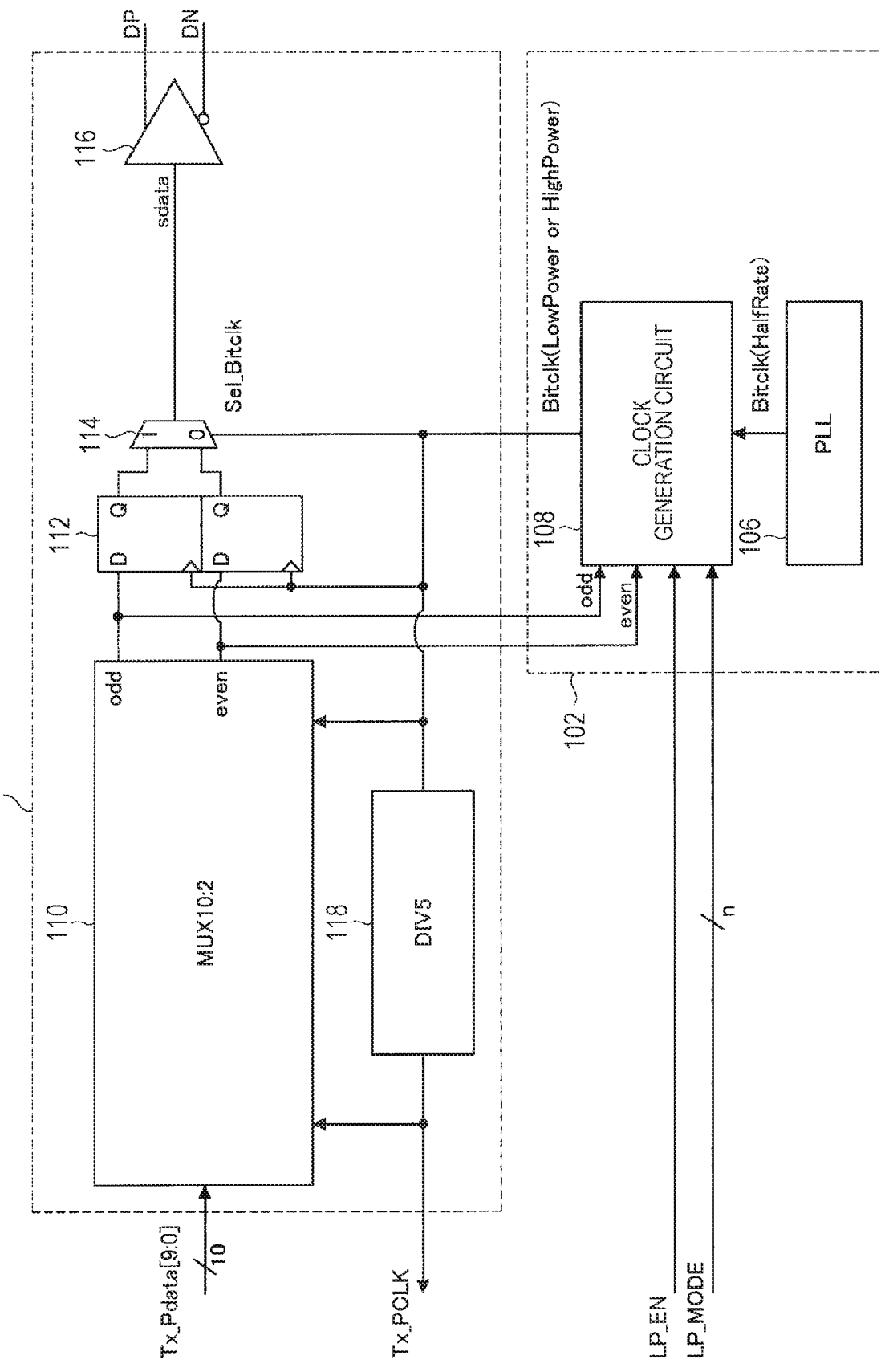
FIG. 8 is an explanatory diagram illustrating an exemplary configuration of the transmission apparatus according to the present embodiment.

FIG. 8 is an explanatory diagram illustrating the exemplary configuration of the transmission apparatus 100 according to the present embodiment. FIG. 8 illustrates an exemplary case where the transmission apparatus 100 transmits 10 [bit] parallel data as serial data in a similar manner to FIG. 5.

The transmission apparatus 100 includes, for example, a clock signal generator 102, and a transmitter 104.

Furthermore, the transmission apparatus 100 may include a processor (not illustrated) that controls the entire transmission apparatus 100, for example. Operation of the transmission apparatus 100 in each period (data transmission period and data transmission pause period) is controlled by, for example, the processor (not illustrated) included in the transmission apparatus 100 or an external device (e.g., device having a function similar to that of the processor (not illustrated)).

The transmission apparatus 100 is driven by, for example, power supplied from an internal power supply (not illustrated) included in the transmission apparatus 100, such as a battery, power supplied from an external power supply connected to the transmission apparatus 100, or the like.

[1-2-3-1] Clock Signal Generator 102

The clock signal generator 102 generates clock signals. The clock signal generator 102 generates first clock signals (clock signals for data transmission) during the data transmission period, and generates second clock signals (clock signals having a frequency lower than that of the first clock signals) during the data transmission pause period.

The clock signal generator 102 includes, for example, a PLL circuit 106, and a clock generation circuit 108.

The PLL circuit 106 functions to generate the first clock signals. In a case where the data transmission speed in the transmission apparatus 100 is 5 [Gbps], examples of the first clock signals generated by the PLL circuit 106 include clock signals having a frequency of 2.5 [GHz]. Hereinafter, the first clock signals generated by the PLL circuit 106 may be referred to as "Bitclk (HalfRate)".

The clock generation circuit 108 functions to generate the second clock signals.

The clock generation circuit 108 selectively generates the second clock signals on the basis of, for example, control signals (e.g., "LP_EN" and "LP_MODE" illustrated in FIG. 8) transmitted from the processor (not illustrated) included in the transmission apparatus 100 or an external device. Here, selectively generating the second clock signals indicates, for example, that the clock generation circuit 108 generates the second clock signals during the data transmission pause period and does not generate the second clock signals during the data transmission period. Note that, although FIG. 8 illustrates an exemplary case where data ("odd" and "even" illustrated in FIG. 8) output from a multiplexer 110 is input to the clock generation circuit 108, the data output from the multiplexer 110 may not be input to the clock generation circuit 108 as illustrated in exemplary implementation of the clock generation circuit 108 to be described later.

In the case of generating the second clock signals, the clock generation circuit 108 outputs the generated second clock signals (corresponding to "Bitclk (Low Power)" illustrated in FIG. 8). Furthermore, in the case of not generating the second clock signals, the clock generation circuit 108 outputs the first clock signals transmitted from the PLL circuit 106 (corresponding to "Bitclk (High Power)" illustrated in FIG. 8).

Examples of a method of implementing the clock generation circuit 108 include a "method of generating second clock signals (low-speed clock) from first clock signals (high-speed clock) using a frequency divider circuit and performing switching using a selector".

Figure 9:
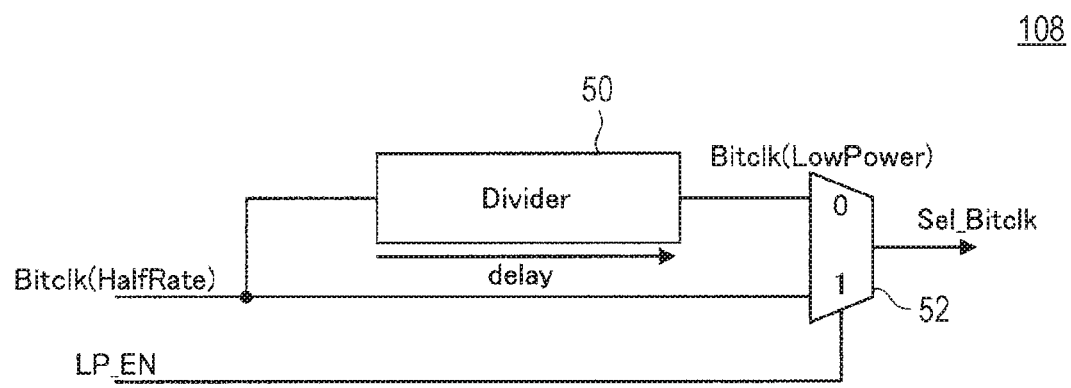
FIG. 9 is an explanatory diagram illustrating an exemplary configuration of a clock generation circuit included in the transmission apparatus according to the present embodiment.

FIG. 9 is an explanatory diagram illustrating an exemplary configuration of the clock generation circuit 108 included in the transmission apparatus 100 according to the present embodiment. FIG. 9 illustrates an exemplary configuration of the clock generation circuit 108 corresponding to the "method of generating the second clock signals (low-speed clock) from the first clock signals (high-speed clock) using a frequency divider circuit and performing switching using a selector". "Bitclk (Half Rate)" illustrated in FIG. 9 corresponds to the first clock signals, and "Bitclk (Low Power)" illustrated in FIG. 9 corresponds to the second clock signals (the same applies in other drawings hereinafter).

In the clock generation circuit 108 having a configuration illustrated in FIG. 9, a frequency divider circuit 50 divides the first clock signals to generate the second clock signals, and the clock signals to be output are switched by a selector 52.

Figure 10:
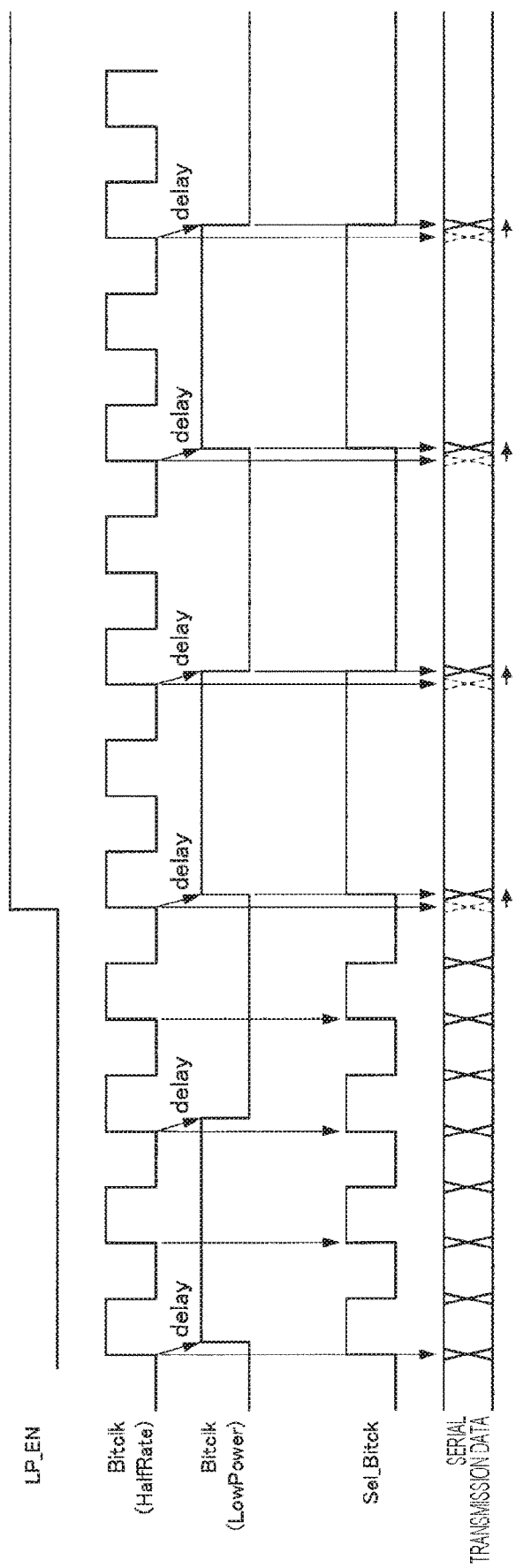
FIG. 10 is an explanatory diagram illustrating exemplary operation in the transmission apparatus including the clock generation circuit illustrated in FIG. 9.

FIG. 10 is an explanatory diagram illustrating exemplary operation in the transmission apparatus 100 including the clock generation circuit 108 illustrated in FIG. 9.

In the clock generation circuit 108 having the configuration illustrated in FIG. 9, channels are different before and after the switching of the clock signals, whereby an amount of delay differs between the first clock signals and the second clock signals ("delay" illustrated in FIG. 10). Therefore, in the transmission apparatus 100 including the clock generation circuit 108 illustrated in FIG. 9, an edge sift of the clock signals may occur, and it becomes jitter of the transmission clock in a case where the edge shift occurs. Therefore, in the communication system 1000 including the transmission apparatus 100 including the clock generation circuit 108 illustrated in FIG. 9, the CDR may be out of synchronization.

In view of the above, the transmission apparatus 100 employs a configuration according to a "method of generating the second clock signals by shaping a waveform of the first clock signals" instead of the "method of generating the second clock signals from the first clock signals using a frequency divider circuit and performing switching using a selector" described above. That is, the clock generation circuit 108 generates the second clock signals by shaping the waveform of the first clock signals.

More specifically, the clock generation circuit 108 shapes the waveform of the first clock signals by one or both of deleting the high-level pulses of the first clock signals and filling the low-level pulses of the first clock signals. Here, deleting the high-level pulses of the first clock signals corresponds to, for example, being shaped in such a manner that a portion in which "the pulse changes in order of low level, high level, and low level" in the first clock signals is fixed to the low level. Furthermore, filling the low-level pulses of the first clock signals corresponds to, for example, being shaped in such a manner that a portion in which "the pulse changes in order of high level, low level, and high level" in the first clock signals is fixed to the high level.

Figure 11:
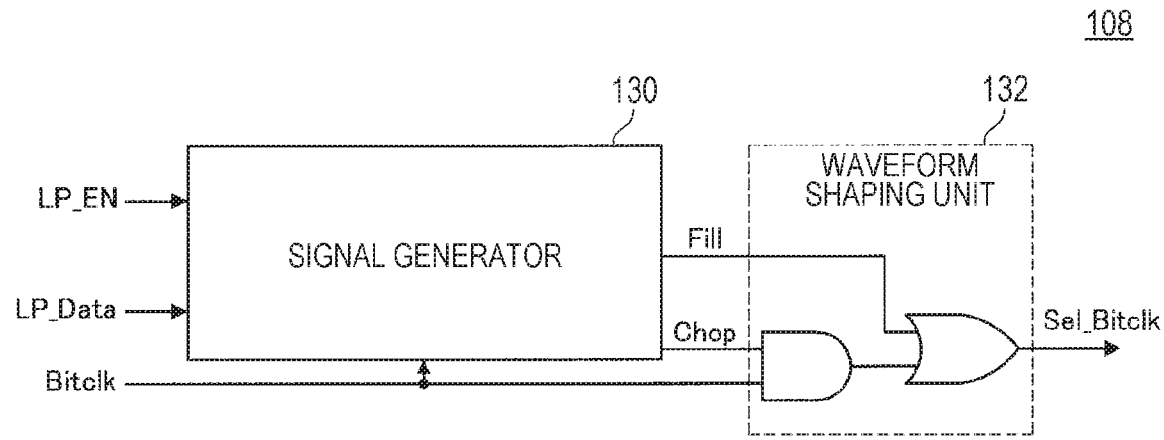
FIG. 11 is an explanatory diagram illustrating another exemplary configuration of the clock generation circuit included in the transmission apparatus according to the present embodiment.

FIG. 11 is an explanatory diagram illustrating another exemplary configuration of the clock generation circuit 108 included in the transmission apparatus 100 according to the present embodiment. FIG. 11 illustrates an exemplary configuration of the clock generation circuit 108 corresponding to the "method of generating the second clock signals by shaping the waveform of the first clock signals".

The clock generation circuit 108 includes a signal generator 130, and a waveform politics and economics unit 132.

The signal generator 130 generates one or both of signals in which high-level pulses are deleted from the first clock signals ("Chop" illustrated in FIG. 11; the same applies in other drawings) and signals in which low-level pulses are filled in the first clock signals ("Fill" illustrated in FIG. 11; the same applies in other drawings). Note that, although an exemplary case where data ("LP_Data" illustrated in FIG. 11) is input to the signal generator 130 is illustrated in FIG. 11, the data may not be input to the signal generator 130 as illustrated in exemplary implementation of the clock generation circuit 108 to be described later. The data to be input to the signal generator 130 (e.g., data to be input to the clock generation circuit 108) is transmitted from, for example, a processor (not illustrated) included in the transmission apparatus 100 or an external device.

The waveform politics and economics unit 132 selectively generates the second clock signals in which the waveform of the first clock signals is shaped on the basis of the signals generated by the signal generator 130.

Figure 12:
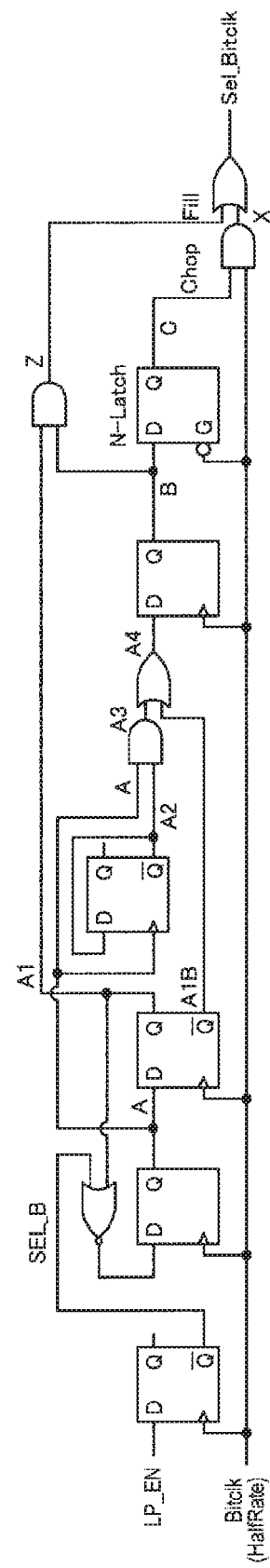
FIG. 12 is an explanatory diagram illustrating exemplary implementation of the clock generation circuit illustrated in FIG. 11.
Figure 13:
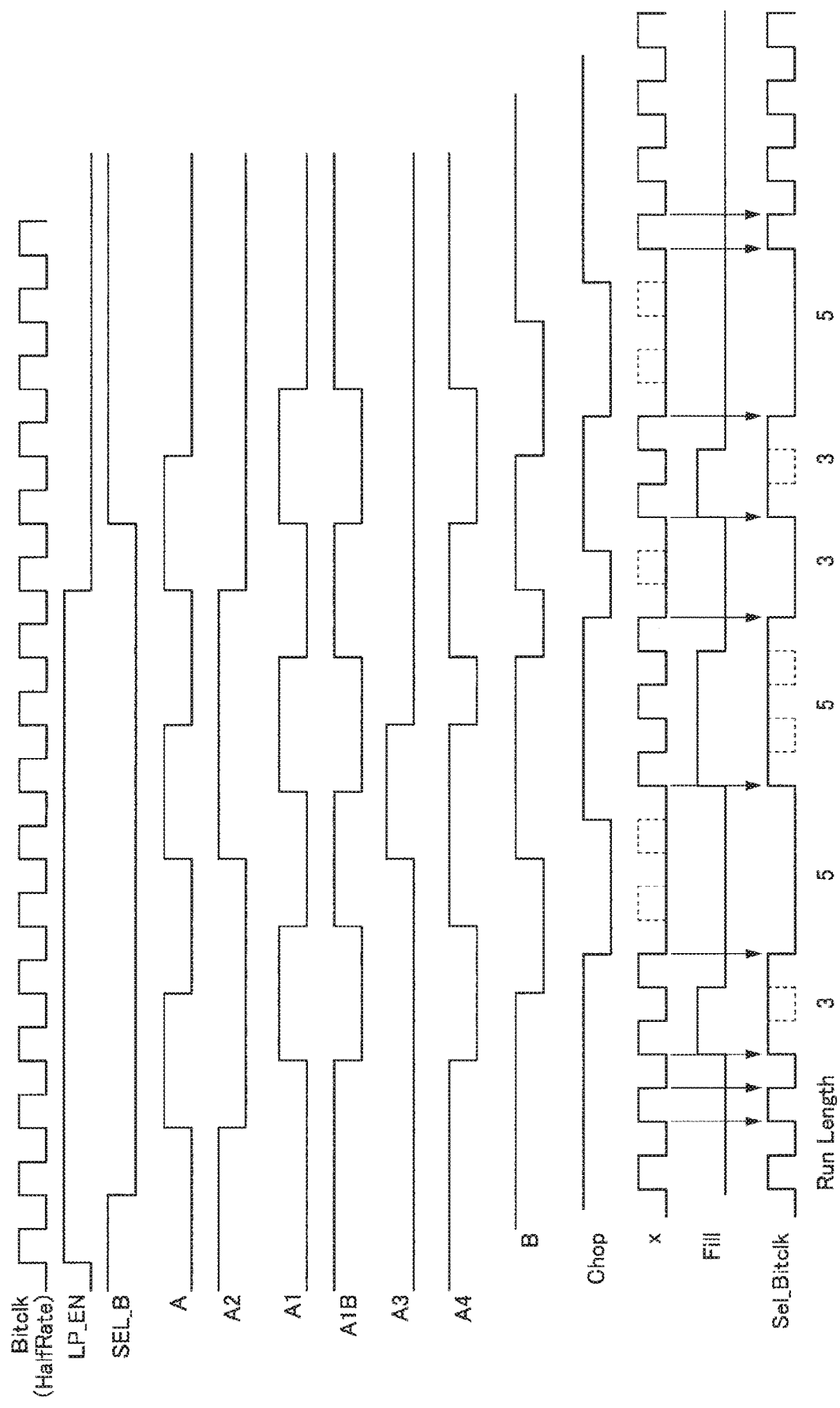
FIG. 13 is an explanatory diagram illustrating exemplary operation of the clock generation circuit having the configuration illustrated in FIG. 12.

FIG. 12 is an explanatory diagram illustrating exemplary implementation of the clock generation circuit 108 illustrated in FIG. 11, which illustrates "exemplary implementation of the clock generation circuit 108 capable of shaping the waveform of the first clock signals by both of deleting the high-level pulses of the first clock signals and filling the low-level pulses of the first clock signals". FIG. 13 is an explanatory diagram illustrating exemplary operation of the clock generation circuit 108 having the configuration illustrated in FIG. 12.

As illustrated in FIGS. 12 and 13, the clock generation circuit 108 having the configuration illustrated in FIG. 12 deletes the high-level pulses of the first clock signals (high-speed clock) transmitted from the PLL circuit 106 with chop signals, and fills the low-level pulses of the first clock signals with fill signals. The clock generation circuit 108 having the configuration illustrated in FIG. 12 deletes the high-level pulses of the first clock signals, and fills the low-level pulses of the first clock signals, thereby generating the second clock signals (low-speed clock) in which the waveform of the first clock signals is shaped.

Here, in the clock generation circuit 108 having the configuration illustrated in FIG. 12, the second clock signals are generated by utilizing the edge of the first clock signals based on waveform shaping, and the channels of the first clock signals and the second clock signals are the same. Therefore, in the clock generation circuit 108 having the configuration illustrated in FIG. 12, jitter of the transmission clock does not occur due to switching of the clock signals.

Note that the exemplary implementation of the clock generation circuit 108 illustrated in FIG. 11 is not limited to the example illustrated in FIG. 12.

For example, it is possible to employ a configuration in which distribution of the number of high-level pulses deleted from the first clock signals (hereinafter referred to as "Chop number") and the number of low-level pulses filled in the first clock signals (hereinafter referred to as "Fill number") is changed. Furthermore, it is possible to dynamically change the distribution of the Chop number and the Fill number by implementing the clock generation circuit 108 using a program frequency divider, for example. The duty ratio changes at the same number of frequency divisions by the distribution of the Chop number and the Fill number being changed.

Figure 14:
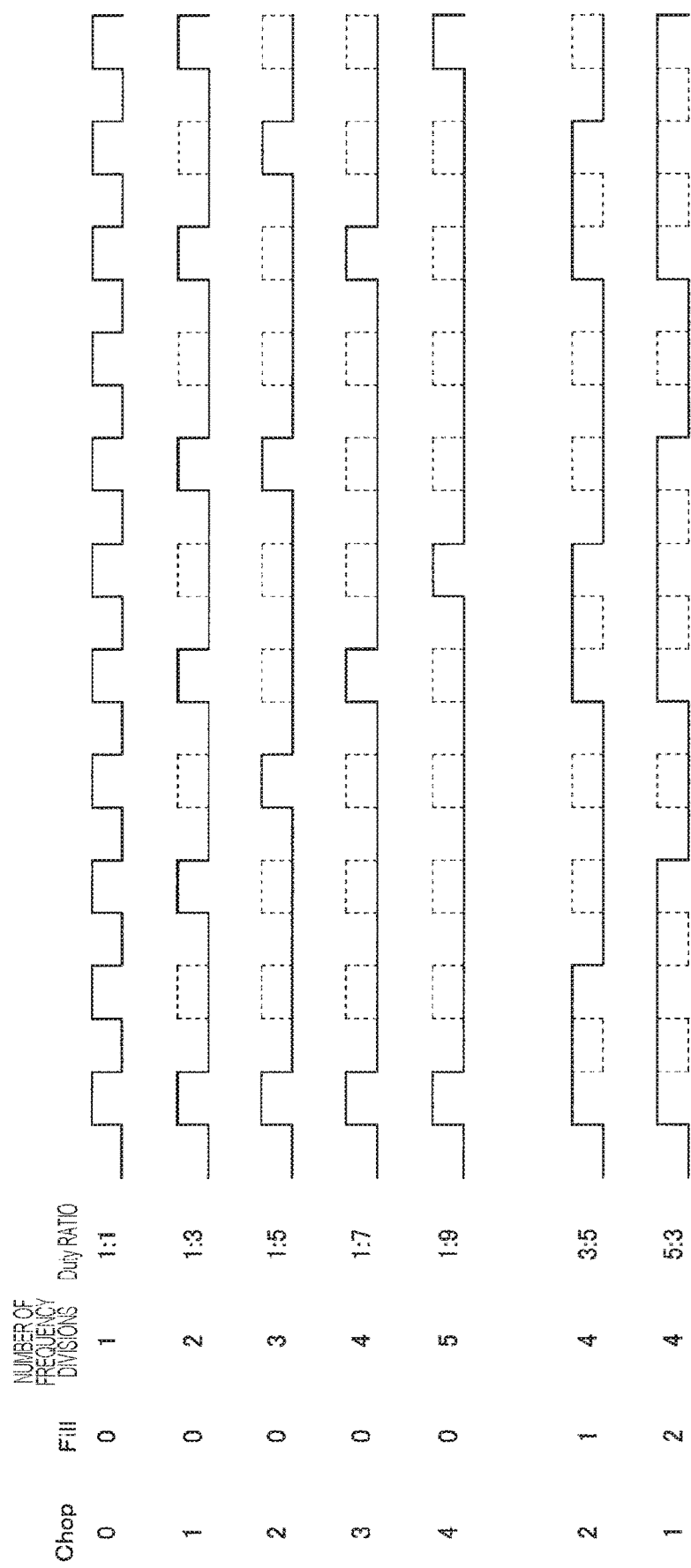
FIG. 14 is an explanatory diagram illustrating an exemplary relationship among the number of high-level pulses deleted from first clock signals (Chop number), the number of low-level pulses filled in the first clock signals (Fill number), the number of frequency divisions, and a duty ratio.

FIG. 14 is an explanatory diagram illustrating an exemplary relationship among the number of high-level pulses deleted from the first clock signals (Chop number), the number of low-level pulses filled in the first clock signals (Fill number), the number of frequency divisions, and the duty ratio.

As illustrated in FIG. 14, the number of frequency divisions of the second clock signals with respect to the first clock signals is expressed by the following formula 1.

Frequency division number=(Chop number)+(Fill number)+1   (Formula 1)

For example, as illustrated in FIG. 14, even in the case of a configuration of generating the second clock signals with the changed duty ratio, the clock generation circuit 108 generates the first clock signals by shaping the waveform, and the channels of the first clock signals and the second clock signals are the same. Therefore, even in a case where the clock generation circuit 108 employs the configuration of generating the second clock signals with the changed duty ratio as illustrated in FIG. 14, jitter of the transmission clock does not occur due to switching of the clock signals.

Furthermore, the clock generation circuit 108 may generate second clock signals that function as pulse width modulation (PWM) signals using a duty variable. That is, the clock generation circuit 108 can cause the second clock signals (low-speed clock) to have data meaning using the duty variable.

Figure 15:
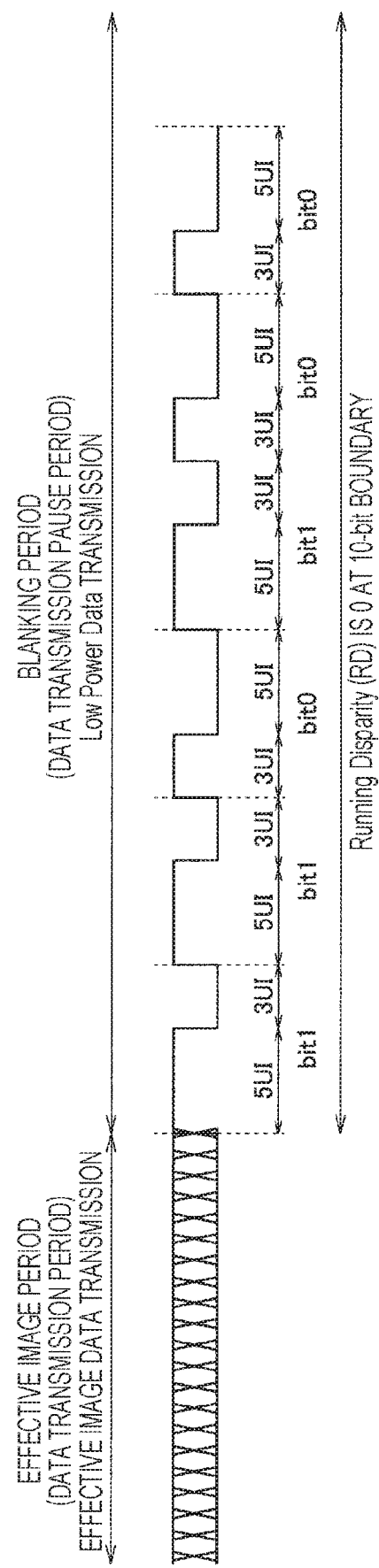
FIG. 15 is an explanatory diagram for illustrating another exemplary operation of the transmission apparatus according to the present embodiment.

FIG. 15 is an explanatory diagram for illustrating another exemplary operation of the transmission apparatus 100 according to the present embodiment, which illustrates exemplary operation in the case where the clock generation circuit 108 included in the transmission apparatus 100 generates the second clock signals that function as the PWM signals. In a similar manner to FIG. 3, FIG. 15 illustrates exemplary operation in the case where the transmission apparatus 100 transmits image data.

As illustrated in FIG. 15, during the blanking period of the image data, the transmission apparatus 100 can superimpose data on a periodic clock edge in synchronization signals for maintaining CDR synchronization, and transmit PWM data with low power consumption. Here, FIG. 15 illustrates an exemplary case where the duty ratio 5:3 is defined as the data value "1", and the duty ratio 3:5 is defined as the data value "0".

Examples of the PWM data indicated by the second clock signals include various kinds of data such as audio data and control data.

Since the PWM data can be decoded by a small-scale receiving circuit, the receiving apparatus 200 does not significantly increase the power consumption due to reception of the PWM data.

Moreover, if the PWM data is encoded and transmitted according to a scheme similar to that of the data transmitted during the data transmission period, such as transmitting the PWM data having been subject to 8b10b encoding, the transmission apparatus 100 can transmit the PWM data using the same circuit as the data transmitted during the data transmission period. Furthermore, in a case where the PWM data is subject to 8b10b encoding and transmitted, the running disparity of the data (difference in total number between 1 and 0) is kept at zero, whereby the DC balance is kept and stabilized even in a case where the transmission path T is a capacitively coupled transmission path.

Figure 16:
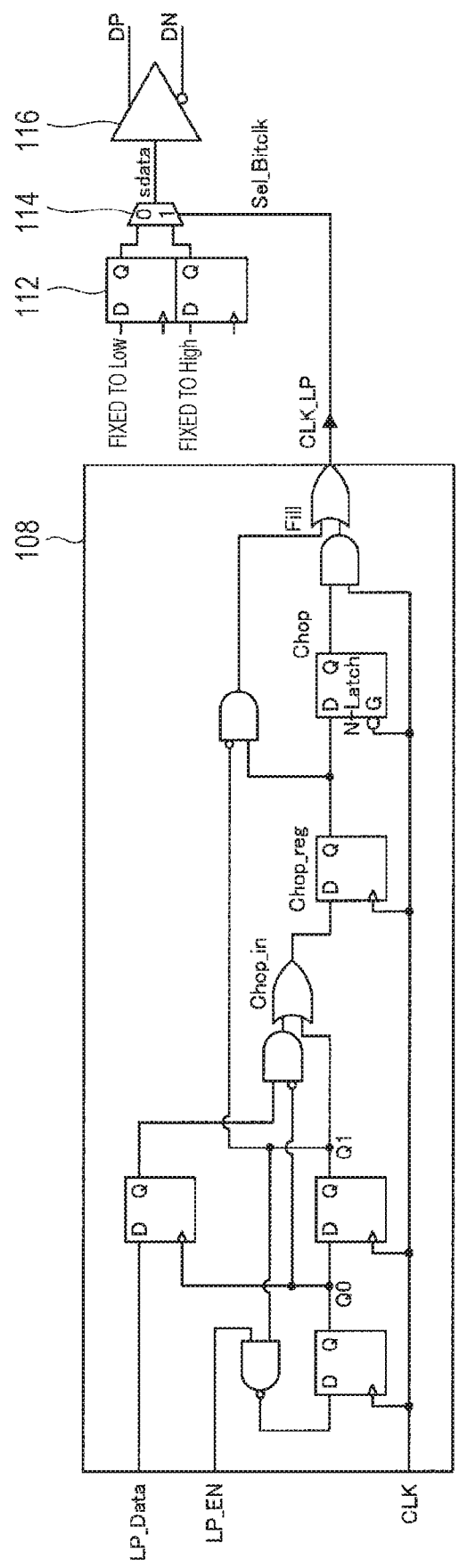
FIG. 16 is an explanatory diagram illustrating another exemplary implementation of the clock generation circuit illustrated in FIG. 11.
Figure 17:
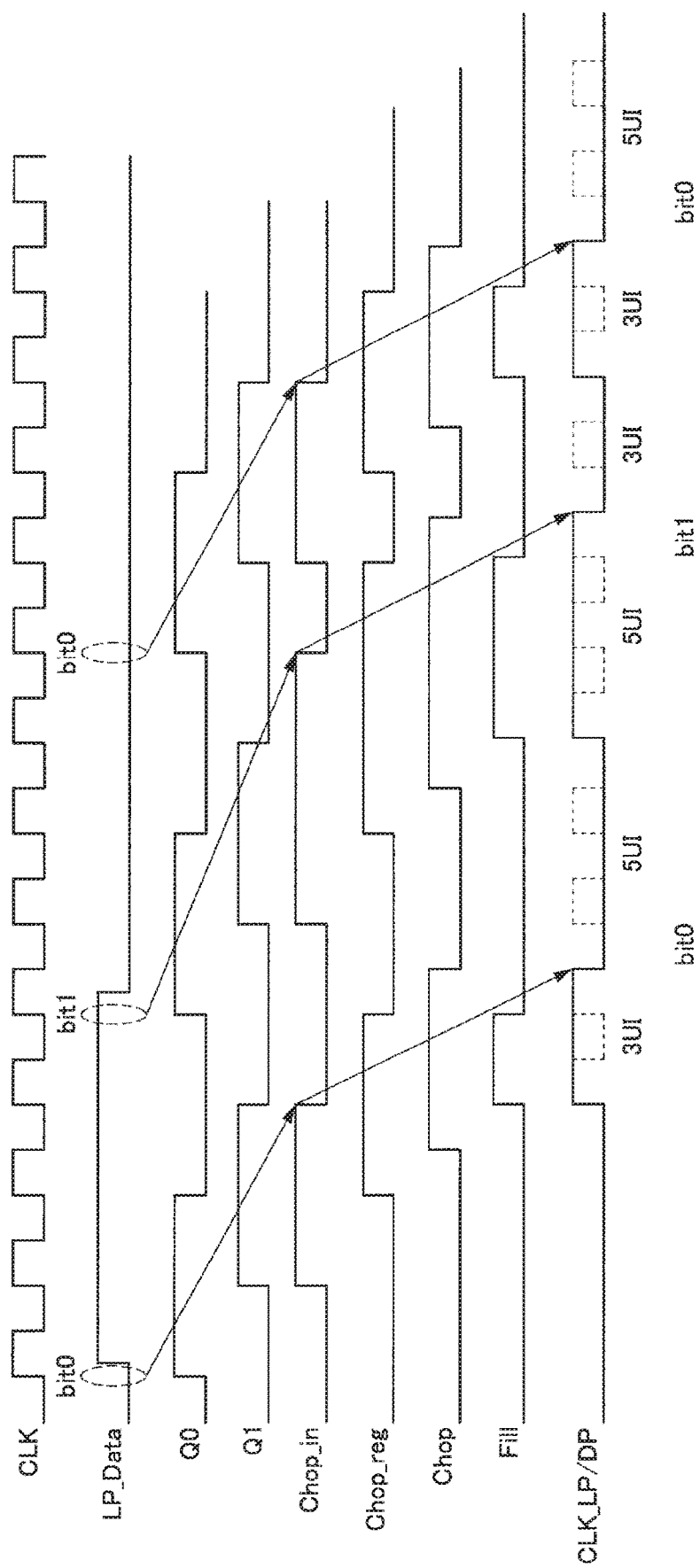
FIG. 17 is an explanatory diagram illustrating exemplary operation of the clock generation circuit having the configuration illustrated in FIG. 16.

FIG. 16 is an explanatory diagram illustrating another exemplary implementation of the clock generation circuit 108 illustrated in FIG. 11. FIG. 17 is an explanatory diagram illustrating exemplary operation of the clock generation circuit 108 having the configuration illustrated in FIG. 16. FIG. 16 also illustrates a D-type flip-flop 112, a selector 114, and a driver 116 illustrated in FIG. 8. Furthermore, FIG. 17 illustrates an exemplary case where the duty ratio 5:3 is defined as the data value "1" and the duty ratio 3:5 is defined as the data value "0", and the bit rate of the PWM data is 1 [bit]/8 [UI], which is ⅛ of the bit rate of data transmitted during the data transmission period.

As illustrated in FIGS. 16 and 17, the clock generation circuit 108 having the configuration illustrated in FIG. 16 can generate the second clock signals indicating the PWM data corresponding to the data (LP_Data illustrated in FIGS. 16 and 17) input to the clock generation circuit 108.

[1-2-3-2] Transmitter 104

The transmitter 104 operates on the basis of the clock signals (first clock signals or second clock signals) generated by the clock signal generator 102, and transmits data in which the clock signals are embedded or synchronization signals.

More specifically, during the data transmission period, the transmitter 104 transmits data in which the first clock signals are embedded on the basis of the first clock signals. Furthermore, during the data transmission pause period, the transmitter 104 transmits synchronization signals on the basis of the second clock signals.

The transmitter 104 includes, for example, the multiplexer 110, the D-type flip-flop 112, the selector 114, the driver 116, and a frequency divider circuit 118. Functions and operations of the multiplexer 110, the D-type flip-flop 112, the selector 114, the driver 116, and the frequency divider circuit 118 are similar to those of the multiplexer 16, the D-type flip-flop 18, the selector 20, the driver 22, and the frequency divider circuit 24 included in the transmission apparatus 10 illustrated in FIG. 5.

Note that, as illustrated in FIG. 16, for example, in a case where the clock generation circuit 108 generates the second clock signals that function as the PWM signals, input of the D-type flip-flop 112 may be fixed at a high level or a low level.

The transmission apparatus 100 has the configuration illustrated in FIG. 8, for example.

Here, the transmission apparatus 100 generates the first clock signals for data transmission during the data transmission period, and transmits the data in which the clock signals are embedded on the basis of the first clock signals. Therefore, during the data transmission period, data exchange is carried out on the basis of the first clock signals (high-speed clock) while the CDR synchronization in the receiving apparatus 200 is maintained.

Furthermore, during the data transmission pause period, the transmission apparatus 100 generates the second clock signals (low-speed clock) having a frequency lower than that of the first clock signals, and transmits the synchronization signals on the basis of the second clock signals. Therefore, the transmission apparatus 100 can reduce power consumption during the data transmission pause period. Furthermore, during the data transmission pause period, the transmission apparatus 100 transmits synchronization signals, thereby maintaining CDR synchronization in the receiving apparatus 200.

Therefore, the transmission apparatus 100 can achieve low power consumption while maintaining the CDR synchronization in the receiving apparatus 200.

Note that the configuration of the transmission apparatus 100 according to the present embodiment is not limited to the configuration illustrated in FIG. 8.

For example, although the configuration of the transmitter 104 that transmits the data having been subject to the 8b10b encoding is illustrated in FIG. 8, the transmission apparatus 100 can employ a configuration corresponding to any encoding scheme.

[2] Effects Exerted in the Communication System According to the Present Embodiment In the communication system according to the present embodiment, for example, the following effects are exerted. Note that it goes without saying that the effects exerted by the communication system according to the present embodiment are not limited to the examples to be described below.

- Electrification in a data transmission pause period can be achieved in a communication interface of an embedded clock type that uses CDR for reception synchronization
- Since CDR synchronization can be maintained on the side of the receiving apparatus 200 during the data transmission pause period, data transmission can be resumed immediately after the data transmission pause period has elapsed, whereby the data transfer efficiency (i.e., power efficiency) of the entire communication in the communication system can be improved
- Since the transmission apparatus 100 can perform data transmission at a speed lower than that in the data transmission period even in the data transmission pause period, whereby, for example, incidental data transmission or transmission of a control command or the like of the receiving apparatus 200 can be performed during the data transmission pause period

[3] Exemplary Application of the Communication System According to the Present Embodiment Although the transmission apparatus has been described above as a component of the communication system according to the present embodiment, the present embodiment is not limited to such a form. The present embodiment is applicable to various image sensors, such as "image sensors used in any mobile body such as an automobile, electric automobile, hybrid electric automobile, motorcycle, bicycle, personal mobility, airplane, drone, ship, robot, artificial satellite, and probe vehicle", "industrial image sensors used in factories, logistics systems, and the like", "image sensors used in intelligent transport systems (ITS)", and "security image sensors", for example. Furthermore, the present embodiment is applicable to any device (or system) having a transmission function, such as "any device including an image sensor such as the above-mentioned mobile body including the image sensor", "imaging devices such as a digital still camera and a digital video camera", "computers such as a personal computer (PC) and a server", "tablet devices", and "game machines", for example.

Furthermore, although the receiving apparatus has been described above as a component of the communication system according to the present embodiment, the present embodiment is not limited to such a form. The present embodiment is applicable to any device (or system) having a function of receiving signals transmitted from the transmission apparatus according to the present embodiment, such as "processors such as a digital signal processor (DSP)" and "movement assistance systems of mobile bodies such as an advanced driving assistant system (ADAS)", for example. The present embodiment is applicable to any device (or system) to which the transmission apparatus according to the present embodiment is applied.

Furthermore, as described above, the communication system according to the present embodiment is applied to, for example, any system that performs serial communication of an embedded clock type using CDR for reception synchronization and is capable of wired or wireless communication, such as PCI Express, USB 3.x, Display Port, MIPI M-PHY, VbyOne, and SLVS-EC.

Hereinafter, the communication system according to the present embodiment using the SLVS-EC will be described using an exemplary case where the transmission apparatus included in the communication system according to the present embodiment is an image sensor and the receiving apparatus included in the communication system according to the present embodiment is a DSP.

[3-1] Configuration of the Communication System Using SLVS-EC

Figure 18:
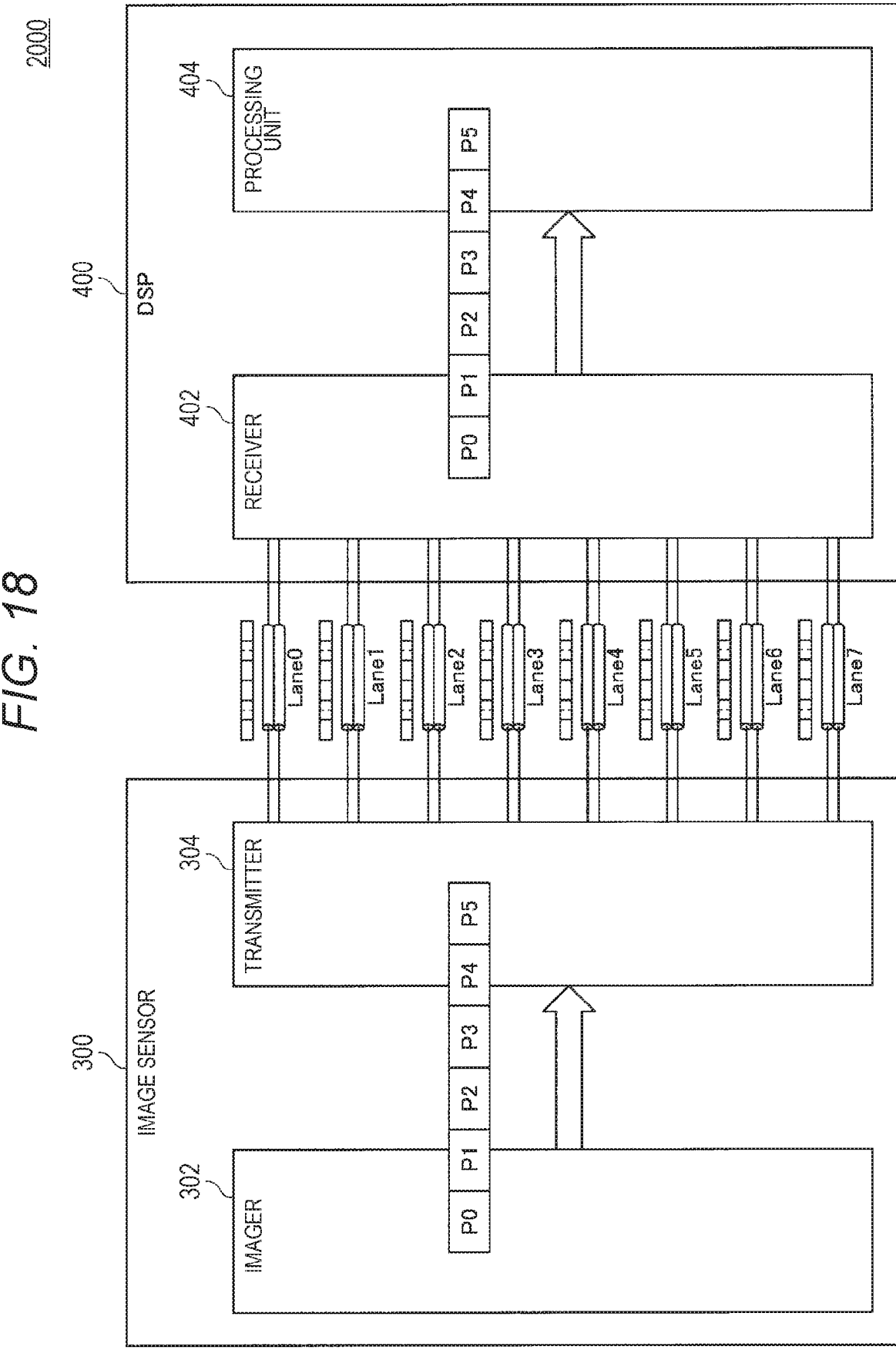
FIG. 18 is an explanatory diagram illustrating an exemplary configuration of the communication system according to the present embodiment in which SLVS-EC is used.

FIG. 18 is an explanatory diagram illustrating an exemplary configuration of a communication system 2000 according to the present embodiment in which SLVS-EC is used.

The communication system 2000 includes an image sensor 300 that functions as the transmission apparatus according to the present embodiment, and a DSP 400 that functions as the receiving apparatus according to the present embodiment. The image sensor 300 and the DSP 400 include, for example, different large scale integrated circuits (LSIs), and are provided in a device such as an imaging device. The image sensor 300 and the DSP 400 are driven by power supplied from an internal power supply (not illustrated) included in the device mentioned above, such as a battery, power supplied from an external power supply connected to the device, or the like.

The image sensor 300 includes an imager 302 and a transmitter 304.

The imager 302 includes, for example, a lens/imaging element and a signal processing circuit. The lens/imaging element includes, for example, an optical lens and an image sensor using a plurality of imaging elements such as a complementary metal oxide semiconductor (CMOS) and a charge coupled device (CCD). The signal processing circuit includes, for example, an automatic gain control (AGC) circuit and an analog-to-digital converter (ADC), and converts analog signals generated by the imaging element into digital signals (image data). Then, the signal processing circuit successively transmits, to the transmitter 304, pixel data included in an image of one frame by one pixel data.

The transmitter 304 allocates each pixel data transmitted from the imager 302 to a plurality of transmission paths in the order of transmission from the imager 302, for example, and transmits the data to the DSP 400 in parallel via the plurality of transmission paths. FIG. 18 illustrates an exemplary case where the image sensor 300 and the DSP 400 transmit image data using eight transmission paths. Hereinafter, each of the transmission paths illustrated in FIG. 18 may be indicated as a "Lane". As describe above, the transmission path T according to the present embodiment may be a wired transmission path, or may be a wireless transmission path.

The transmitter 304 includes, for example, the configuration of the transmission apparatus 100 illustrated in FIG. 8. Furthermore, the transmitter 304 includes a configuration corresponding to the SLVS-EC (exemplary serial communication of an embedded clock type using CDR for reception synchronization), such as generation of a packet in a format to be described later, for example.

The DSP 400 includes a receiver 402 and a processing unit 404.

The receiver 402 receives pixel data transmitted from the image sensor 300 via the eight transmission paths, and transmits the data of each pixel to the processing unit 404 in order.

The receiver 402 includes, for example, the configuration of the receiving apparatus 200 illustrated in FIG. 2.

The processing unit 404 generates an image of one frame on the basis of the pixel data transmitted from the receiver 402, and performs various kinds of processing on the generated image. Examples of the processing performed by the processing unit 404 include compression of the image data, image display control, recording of image data in a recording medium, and the like.

In the communication system 2000, for example, transmission of image data is performed between the DSP 400 and the image sensor 300 having the configuration illustrated in FIG. 18.

[3-2] Format

Figure 19:
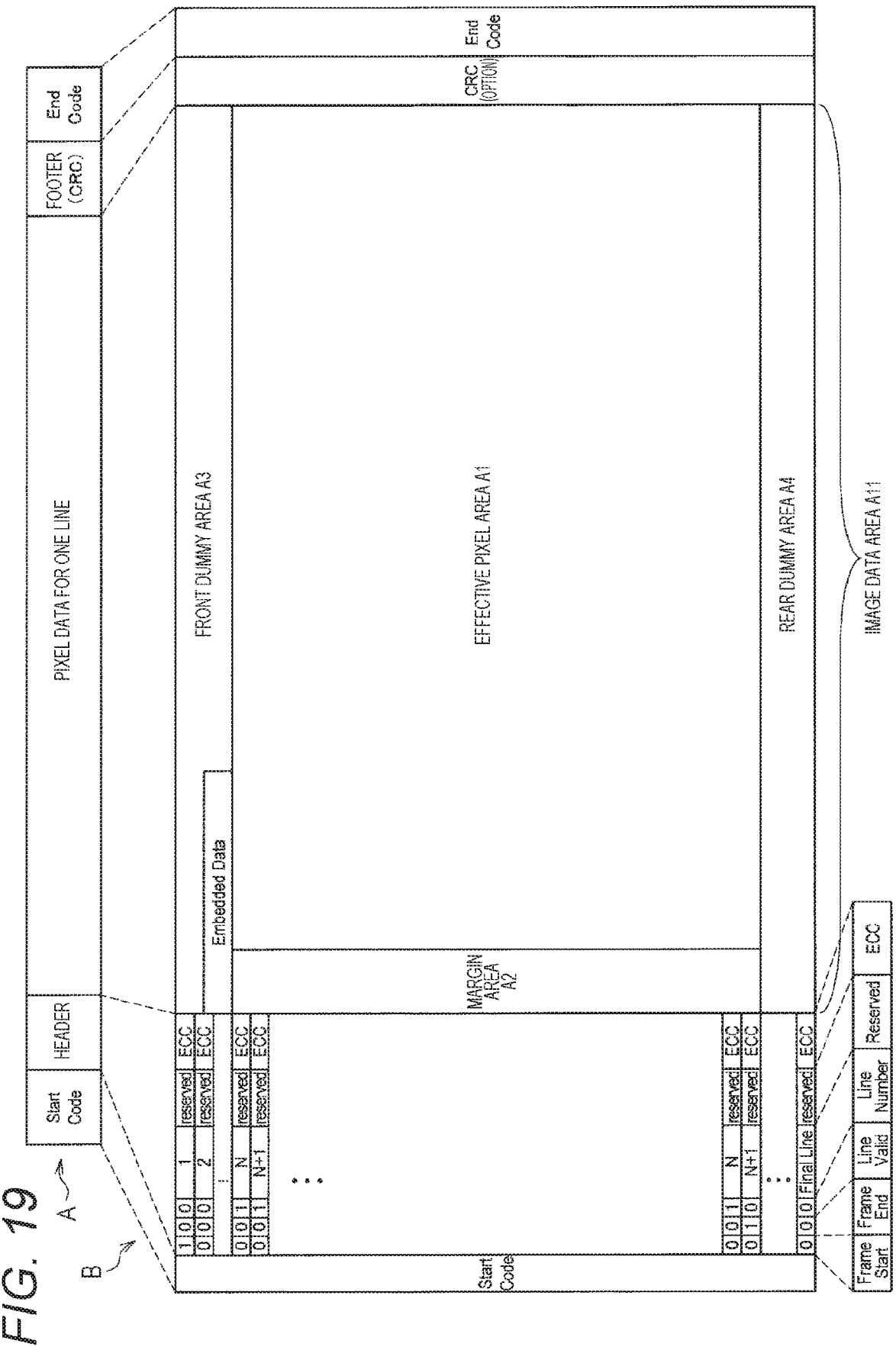
FIG. 19 is an explanatory diagram illustrating an exemplary format used for transmission of one frame of image data between an image sensor and a DSP illustrated in FIG. 18.

FIG. 19 is an explanatory diagram illustrating an exemplary format used for transmission of one frame of image data between the image sensor 300 and the DSP 400 illustrated in FIG. 18.

A of FIG. 19 illustrates a structure of a packet used for data transmission, and B of FIG. 19 illustrates an example of each data included in the packet.

As illustrated in A of FIG. 19, the packet includes, for example, a header, a payload for storing pixel data, and a footer. A header and a footer are added to a payload storing pixel data for one line, thereby forming one packet. Furthermore, a Start Code and an End Code, which are control codes, are added to the packet.

Figure 20:
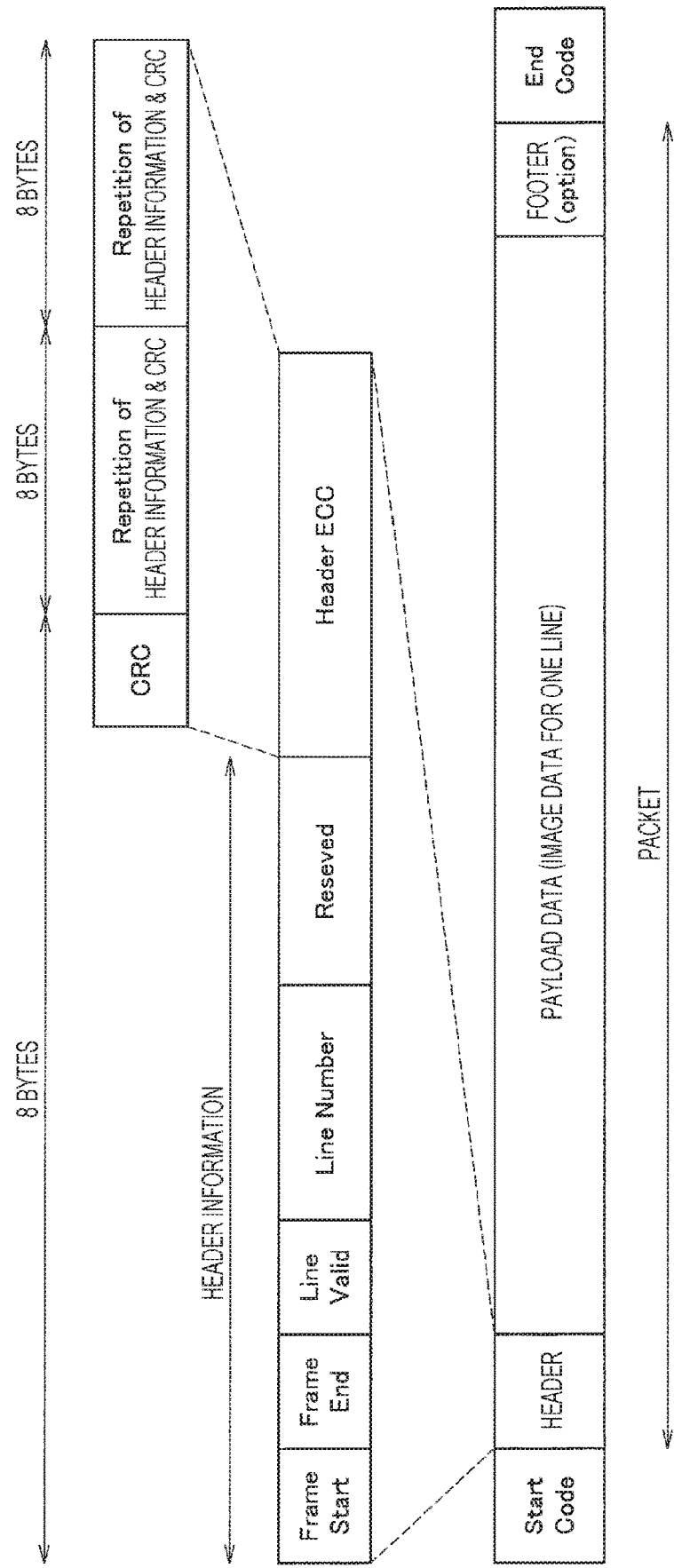
FIG. 20 is an explanatory diagram illustrating an exemplary header structure.

FIG. 20 is an explanatory diagram illustrating an exemplary header structure.

The header includes additional data of the pixel data stored in the payload, such as Frame Start, Frame End, Line Valid, Line Number, and Header Error Correction Code (ECC).

FIG. 21 is an explanatory diagram for illustrating various kinds of data included in the header illustrated in FIG. 20.

The Frame Start is 1 [bit] data indicating the head of the frame. For example, a value of 1 is set in the Frame Start of the header of the packet used for transmission of pixel data of the first line in an image data area A11 illustrated in FIG. 19 to be described later, and a value of 0 is set in the Frame Start of the header of the packet used for transmission of pixel data of another line.

The Frame End is 1 [bit] data indicating the end of the frame. A value of 1 is set in the Frame End of the header of the packet including, in the payload, pixel data of the termination line in an effective pixel area A1 illustrated in FIG. 19 to be described later, and a value of 0 is set in the Frame End of the header of the packet used for transmission of pixel data of another line.

The Line Valid is 1 [bit] data indicating whether or not the pixel data line stored in the payload is a valid pixel line. A value of 1 is set in the Line Valid of the header of the packet used for transmission of pixel data of a line in the effective pixel area A1 illustrated in FIG. 19 to be described later, and a value of 0 is set in the Line Valid of the header of the packet used for transmission of pixel data of another line.

The Line Number is data indicating a line number of a line including the pixel data stored in the payload. The Line Number represents, for example, the line number by 13 [bit].

"Reserved" is an area for scalability. Examples of the Reserved include an area of 32 [bit].

Examples of data volume of header information included in the header illustrated in FIG. 20 include 6 [byte]. Note that it goes without saying that the data volume of the header information included in the header illustrated in FIG. 20 is not limited to 6 [byte].

The Header ECC includes a cyclic redundancy check (CRC) code. For example, in a case where the data volume of the header information included in the header is 6 [byte], the Header ECC includes a CRC code of 2 [byte] calculated on the basis of the header information. Furthermore, the Header ECC includes, following the CRC code, two pieces of data (e.g., data of 8 [byte]) that are the same as the set of the header information and the CRC code.

That is, the header of one packet includes three sets of the same header information and the CRC code.

For example, in a case where the set of the header information and the CRC code is data of 8 [byte], the total data volume of the entire header is 24 [byte], which is obtained by adding the first set of the header information and the CRC code, the second set of the header information and the CRC code, and the third set of the header information and the CRC code.

FIG. 22 is an explanatory diagram illustrating an exemplary bit sequence included in one set of the header information and the CRC code, which illustrates an exemplary bit sequence in the case where one set of the header information and the CRC code is data of 8 [byte].

Byte H7, which is the first 1 [byte] of 8 [byte] included in the header, includes each 1 [bit] of the Frame Start, Frame End, and Line Valid in the order from the first [bit], and the first to fifth [bit] among 13 [bit] of the Line Number.

Byte H6, which is the second 1 [byte], includes 6th to 13th [bit] among the 13 [bit] of the Line Number.

Byte H2, which is the sixth 1 [byte] from Byte H5 that is the third 1 [byte], is to be the Reserved.

Byte H1 that is the seventh 1 [byte] and Byte H0 that is the eighth 1 [byte] include each [bit] of the CRC code.

The header has, for example, the structure described with reference to FIGS. 20 to 22. Note that it goes without saying that the header is not limited to the example described with reference to FIGS. 20 to 22.

Referring to FIG. 19 again, a format used for transmitting one frame of image data will be described.

When horizontal pixel arrangement is to be a line, pixel data is stored in the payload of the packet. Transmission of the entire image data of one frame is performed using the number of packets equal to or larger than the number pixels in the vertical direction of the image data area A11 illustrated in B of FIG. 19.

The effective pixel area A1 illustrated in B of FIG. 19 is an effective pixel area of the image of one frame imaged by the imager 302. On the left side of the effective pixel area A1 in B of FIG. 19, a margin area A2 is set in which the number of pixels in the vertical direction is the same as the number of pixels in the vertical direction of the effective pixel area A1.

On the upper side of the effective pixel area A1 in B of FIG. 19, a front dummy area A3 is set in which the number of pixels in the horizontal direction is the same as the number of pixels in the horizontal direction of the entire effective pixel area A1 and the margin area A2. In the example of FIG. 19, Embedded Data is inserted in the front dummy area A3. The Embedded Data includes, for example, setting value data associated with imaging by the imager 302, such as a shutter speed, aperture value, and gain.

On the lower side of the effective pixel area A1 in B of FIG. 19, a rear dummy area A4 is set in which the number of pixels in the horizontal direction is the same as the number of pixels in the horizontal direction of the entire effective pixel area A1 and the margin area A2. The Embedded Data described above may be inserted in the rear dummy area A4 instead of the front dummy area A3.

The image data area A11 includes, for example, the effective pixel area A1, the margin area A2, the front dummy area A3, and the rear dummy area A4.

A header is added before each line included in the image data area A11, and a Start Code is added before the header. Furthermore, a footer is optionally added after each line included in the image data area A11, and a control code, such as an End Code, is added after the footer. In a case where no footer is added, a control code, such as an End Code, is added after each line included in the image data area A11.

The image sensor 300 transmits data in a format illustrated in FIG. 19, for example, each time one frame of image imaged by the imager 302 is transmitted. With the format illustrated in FIG. 19 being adopted, it becomes possible to transmit additional data, such as a header, and a control code, such as the Start Code and End Code, during the blanking period for each line.

Note that it goes without saying that exemplary format used for transmission of one frame of image data between the DSP 400 and the image sensor 300 illustrated in FIG. 18 is not limited to the example illustrated in FIG. 19.

[3-3] Exemplary Data Transmission in the Communication System 2000

Figure 23:
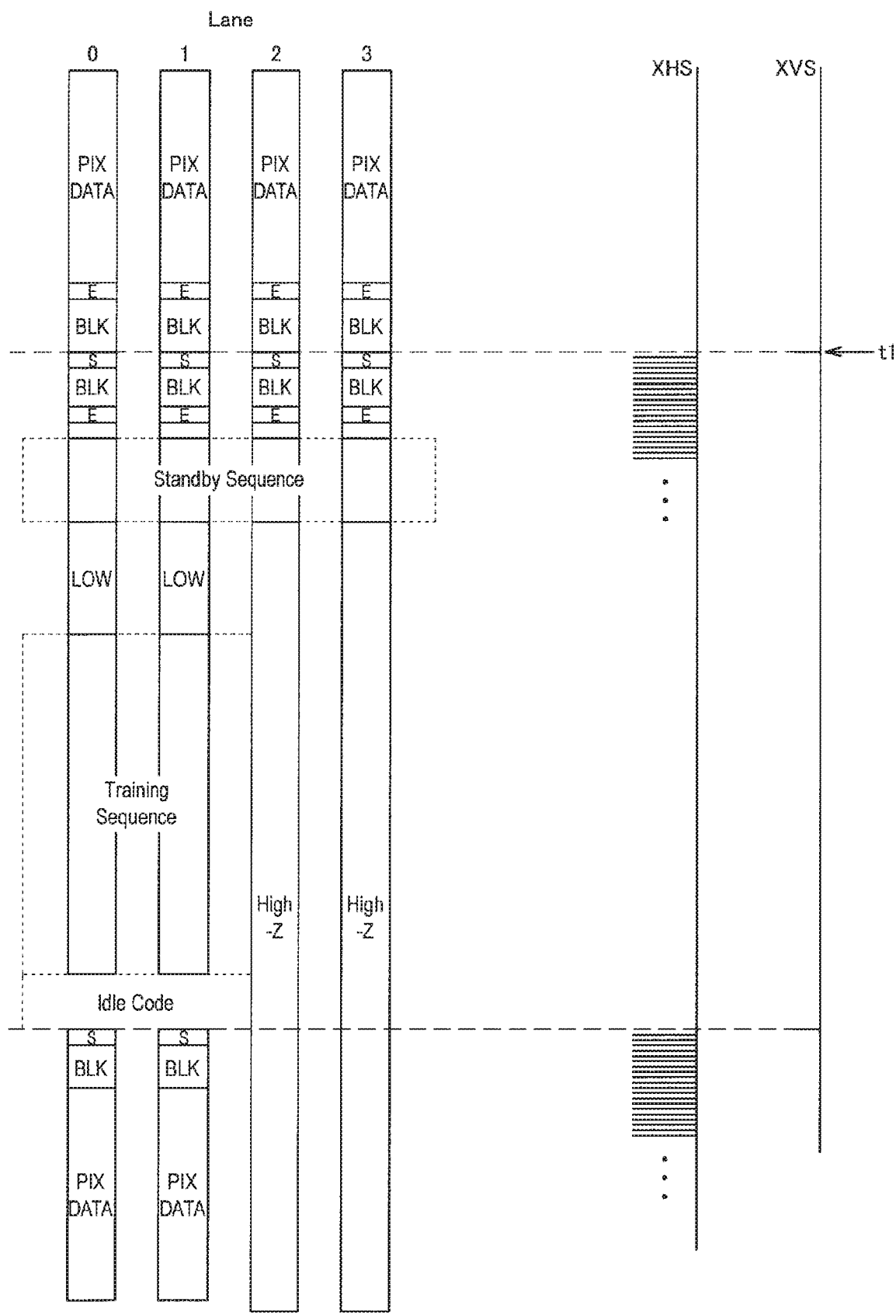
FIG. 23 is an explanatory diagram illustrating exemplary data transmission in the communication system illustrated in FIG. 18.

FIG. 23 is an explanatory diagram illustrating exemplary data transmission in the communication system 2000 illustrated in FIG. 18, which illustrates an exemplary case where image data transmission is performed through four transmission paths. "XVS" illustrated in FIG. 23 represents vertical synchronization signals, and "XHS" illustrated in FIG. 23 represents horizontal synchronization signals. "PIX DATA" illustrated in FIG. 23 indicates that pixel data is being transmitted, and "E" illustrated in FIG. 23 indicates the Frame End. "BLK" illustrated in FIG. 23 indicates the blanking period during which no pixel data is transmitted, and "S" illustrated in FIG. 23 indicates the Frame Start.

Exemplary data transmission in the communication system 2000 will be described with reference to FIG. 23. The image sensor 300 transmits, according to the horizontal synchronization signals, pixel data of each line included in one frame of image until time t1 at which the vertical synchronization signals are detected.

The image sensor 300 transmits data in which the first clock signals are embedded on the basis of the first clock signals (high-speed clock) during the "PIX DATA" period illustrated in FIG. 23 corresponding to the data transmission period.

Furthermore, the image sensor 300 transmits the synchronization signals on the basis of the second clock signals (low-speed clock) during the "BLK" period illustrated in FIG. 23 corresponding to the data transmission pause period. As described above, the image sensor 300 may transmit the PWM data during the "BLK" period illustrated in FIG. 23.

In the communication system 2000, during the "BLK" period illustrated in FIG. 23 corresponding to the data transmission pause period, the image sensor 300 that functions as the transmission apparatus according to the present embodiment generates the second clock signals (low-speed clock) having a frequency lower than that of the first clock signals, and transmits the synchronization signals on the basis of the second clock signals.

Therefore, in the communication system 2000, power consumption of the image sensor 300 during the "BLK" period illustrated in FIG. 23 is reduced. Furthermore, the image sensor 300 transmits the synchronization signals during the "BLK" period illustrated in FIG. 23, thereby maintaining the CDR synchronization in the DSP 400 that functions as the receiving apparatus according to the present embodiment.

Therefore, in the communication system 2000, it becomes possible to reduce power consumption of the image sensor 300 while maintaining the CDR synchronization in the DSP 400.

Note that it goes without saying that the exemplary data transmission in the communication system 2000 is not limited to the example illustrated in FIG. 23.

Although the preferred embodiment of the present disclosure has been described in detail with reference to the accompanying drawings, the technical scope of the present disclosure is not limited to such examples. It is obvious that those skilled in the art in the technical field of the present disclosure may find various alterations and modifications within the technical ideas of the appended claims, and it should be understood that such alterations and modifications are also naturally within the technical scope of the present disclosure.

Furthermore, the effects described in the present specification are merely illustrative or exemplary, and are not limited. That is, the techniques according to the present disclosure can exert other effects obvious to those skilled in the art from the disclosure of the present specification together with or instead of the effects described above.

Note that the following configurations are also within the technical scope of the present disclosure.

(1)

A transmission apparatus including:
a clock signal generator that generates a clock signal; and
a transmitter that operates on the basis of the clock signal and transmits data in which the clock signal is embedded or a synchronization signal for maintaining CDR synchronization, in which
during a period of data transmission,
the clock signal generator generates a first clock signal for data transmission, and
the transmitter transmits data in which the first clock signal is embedded on the basis of the first clock signal, and
during a pause period of data transmission,
the clock signal generator generates a second clock signal having a frequency lower than that of the first clock signal, and
the transmitter transmits the synchronization signal on the basis of the second clock signal.

(2)

The transmission apparatus according to (1), in which the clock signal generator generates the second clock signal by shaping a waveform of the first clock signal.

(3)

The transmission apparatus according to (2), in which the clock signal generator shapes the waveform of the first clock signal by one or both of deleting a high-level pulse of the first clock signal and filling a low-level pulse of the first clock signal.

(4)

The transmission apparatus according to (3), in which a number of frequency divisions of the second clock signal with respect to the first clock signal is expressed by the following Formula 1:

Number of frequency divisions=(number of the high-level pulses to be deleted)+(number of low-level pulses to be filled)+1  (Formula 1).

(5)

The transmission apparatus according to any one of (1) to (4), in which the clock signal generator generates the second clock signal that functions as a PWM signal.

(6)

The transmission apparatus according to any one of (1) to (5), in which the pause period of data transmission includes a blanking period of image data.

(7)

A communication system including:
a transmission apparatus that transmits data in which a clock signal is embedded or a synchronization signal for maintaining CDR synchronization; and a receiving apparatus including a CDR circuit that extracts the clock signal from received data or the synchronization signal and generates a synchronized clock signal synchronized with the extracted clock signal, in which
the transmission apparatus includes:
a clock signal generator that generates the clock signal; and
a transmitter that operates on the basis of the clock signal and transmits the data in which the clock signal is embedded or the synchronization signal,
during a period of data transmission,
the clock signal generator generates a first clock signal for data transmission, and
the transmitter transmits data in which the first clock signal is embedded on the basis of the first clock signal, and
during a pause period of data transmission,
the clock signal generator generates a second clock signal having a frequency lower than that of the first clock signal, and
the transmitter transmits the synchronization signal on the basis of the second clock signal.

REFERENCE SIGNS LIST 10, 100 Transmission apparatus
12, 106 PLL circuit
14, 104, 304 Transmitter
16, 110 Multiplexer
18, 112 D-type flip-flop
20, 52, 114 Selector
22, 116 Driver
24, 50, 118 Frequency divider circuit
102 Clock signal generator
108 Clock generation circuit
130 Signal generator
132 Waveform politics and economics unit
200 Receiving apparatus
202 Receiver circuit
204 CDR circuit
206 Demultiplexer
208 Decoder
300 Image sensor
302 Imager
400 DSP
402 Receiver
404 Processing unit
1000, 2000 Communication system

The invention claimed is:
1. A transmission apparatus comprising:
a clock signal generator that generates a clock signal; and
a transmitter that operates on a basis of the clock signal and transmits data in which the clock signal is embedded or a synchronization signal for maintaining synchronization of clock data recovery (CDR), wherein
during a period of data transmission,
the clock signal generator generates a first clock signal for data transmission, and
the transmitter transmits data in which the first clock signal is embedded on a basis of the first clock signal, and
during a pause period of data transmission,
the clock signal generator generates a second clock signal having a frequency lower than a frequency of the first clock signal, and
the transmitter transmits the synchronization signal on a basis of the second clock signal.

2. The transmission apparatus according to claim 1, wherein
the clock signal generator generates the second clock signal by shaping a waveform of the first clock signal.

3. The transmission apparatus according to claim 2, wherein
the clock signal generator shapes the waveform of the first clock signal by one or both of deleting a high-level pulse of the first clock signal and filling a low-level pulse of the first clock signal.

4. The transmission apparatus according to claim 3, wherein
a number of frequency divisions of the second clock signal with respect to the first clock signal is expressed by a following Formula 1:

Number of frequency divisions=(number of the high-level pulses to be deleted)+(number of low-level pulses to be filled)+1.

5. The transmission apparatus according to claim 1, wherein
the clock signal generator generates the second clock signal that functions as a pulse width modulation (PWM) signal.

6. The transmission apparatus according to claim 1, wherein
the pause period of data transmission includes a blanking period of image data.

7. A communication system comprising:
a transmission apparatus that transmits data in which a clock signal is embedded or a synchronization signal for maintaining synchronization of clock data recovery (CDR); and
a receiving apparatus including a CDR circuit that extracts the clock signal from received data or the synchronization signal and generates a synchronized clock signal synchronized with the extracted clock signal, wherein
the transmission apparatus includes:
a clock signal generator that generates the clock signal; and
a transmitter that operates on a basis of the clock signal and transmits the data in which the clock signal is embedded or the synchronization signal,
during a period of data transmission,
the clock signal generator generates a first clock signal for data transmission, and
the transmitter transmits data in which the first clock signal is embedded on a basis of the first clock signal, and
during a pause period of data transmission,
the clock signal generator generates a second clock signal having a frequency lower than a frequency of the first clock signal, and
the transmitter transmits the synchronization signal on a basis of the second clock signal.

* * * * *